(12) United States Patent
van der Riet

(10) Patent No.: US 7,917,388 B2
(45) Date of Patent: Mar. 29, 2011

(54) MARKETING COMMUNICATION AND TRANSACTION/DISTRIBUTION SERVICES PLATFORM FOR BUILDING AND MANAGING PERSONALIZED CUSTOMER RELATIONSHIPS

(76) Inventor: Ramon van der Riet, Brussels (BE)

( * ) Notice: Subject to any disclaimer, the term of this patent is extended or adjusted under 35 U.S.C. 154(b) by 984 days.

(21) Appl. No.: 11/633,631

(22) Filed: Dec. 4, 2006

(65) Prior Publication Data

US 2007/0260521 A1    Nov. 8, 2007

(51) Int. Cl.
*G06Q 30/00* (2006.01)
(52) U.S. Cl. ............... 705/14.25; 706/14.13; 706/14.53; 706/14.27; 706/14.33; 706/14.41; 706/27.1
(58) Field of Classification Search ............... 705/14.13, 705/14.53, 14.27, 14.33, 14.41, 27.1
See application file for complete search history.

(56) References Cited

U.S. PATENT DOCUMENTS

| | | | | |
|---|---|---|---|---|
| 5,948,061 | A * | 9/1999 | Merriman et al. | 709/219 |
| 6,714,975 | B1 * | 3/2004 | Aggarwal et al. | 709/224 |
| 2001/0049620 | A1 * | 12/2001 | Blasko | 705/10 |
| 2002/0095387 | A1 * | 7/2002 | Sosa et al. | 705/65 |
| 2002/0123926 | A1 * | 9/2002 | Bushold et al. | 705/14 |
| 2003/0014304 | A1 * | 1/2003 | Calvert et al. | 705/14 |
| 2003/0083959 | A1 * | 5/2003 | Song et al. | 705/27 |
| 2004/0044590 | A1 * | 3/2004 | Voorhees | 705/27 |
| 2005/0159921 | A1 * | 7/2005 | Louviere et al. | 702/181 |

* cited by examiner

*Primary Examiner* — Eric W Stamber
*Assistant Examiner* — Nathan C Uber
(74) *Attorney, Agent, or Firm* — Morgan Lewis & Bockius, LLP

(57) ABSTRACT

An interactive marketing communication and transaction services platform for managing personalized customer relationships. The platform facilitates communication and transactions between consumers, retailers and manufacturers, by helping suppliers customize product/service offerings, presentations and advertising messages to reflect individual consumers' needs, while providing portals with premium advertising messages for personal interactive info/news/entertainment services. The core of the platform consists of i) a central database system with 'product/retail information' and 'holistic purchase-behavior specific consumer profiles', generated by registering on-line product/retail information retrieved by consumers, as well as purchases made both on-line and in-store, using a loyalty card; ii) software applications, that create 'market intelligence' on manufacturer/retailer offers, consumer purchase needs, market performance of products/retailers and impact of brand/retailer presentations and ads on consumer purchase behavior; and iii) standard performance indicators, that make it possible to benchmark individual consumer communication programs against each other.

1 Claim, 32 Drawing Sheets

Components of the WebServicesSystem

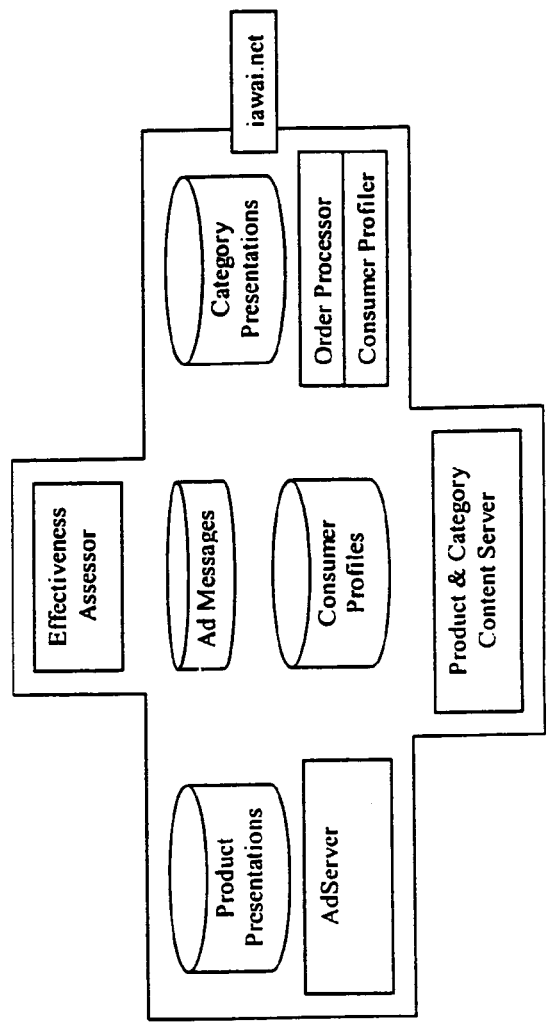
Figure 1: Components of the WebServicesSystem

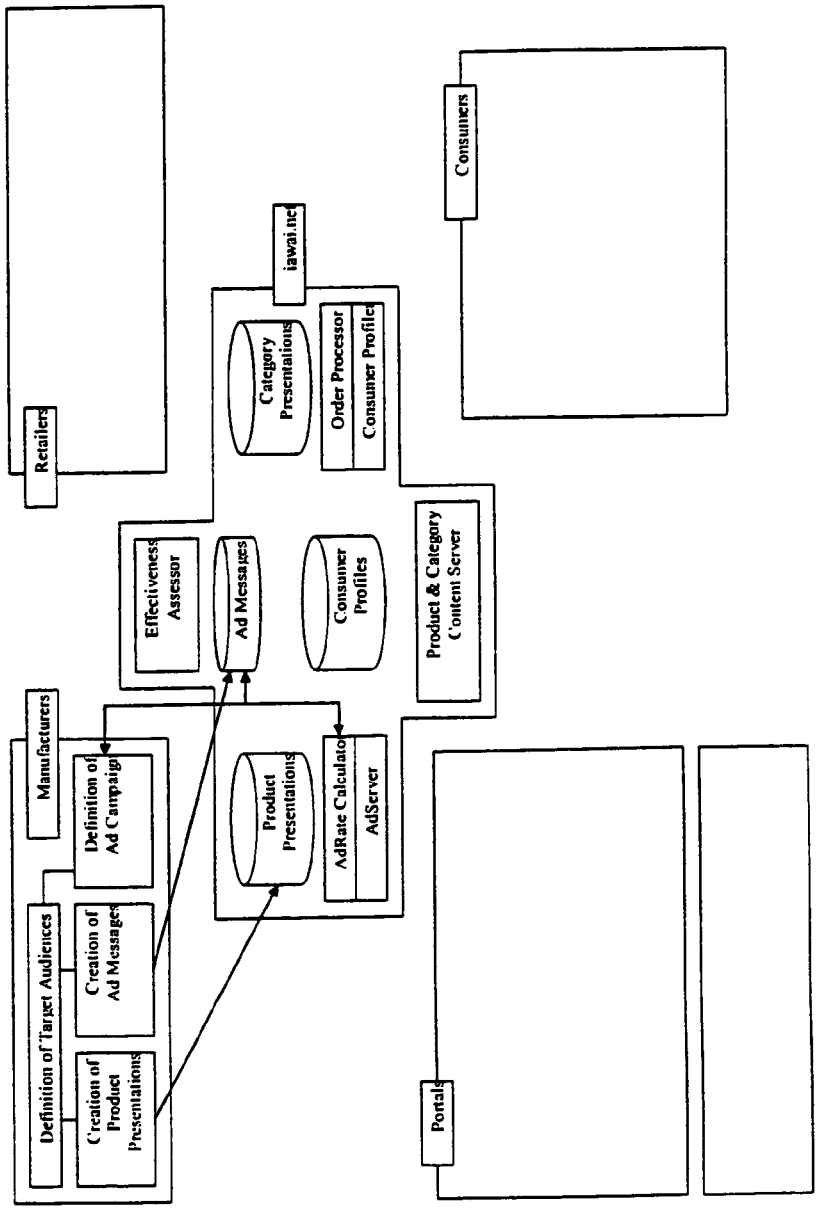
Figure 2: Data uploading interaction between Manufacturers and the WebServices System

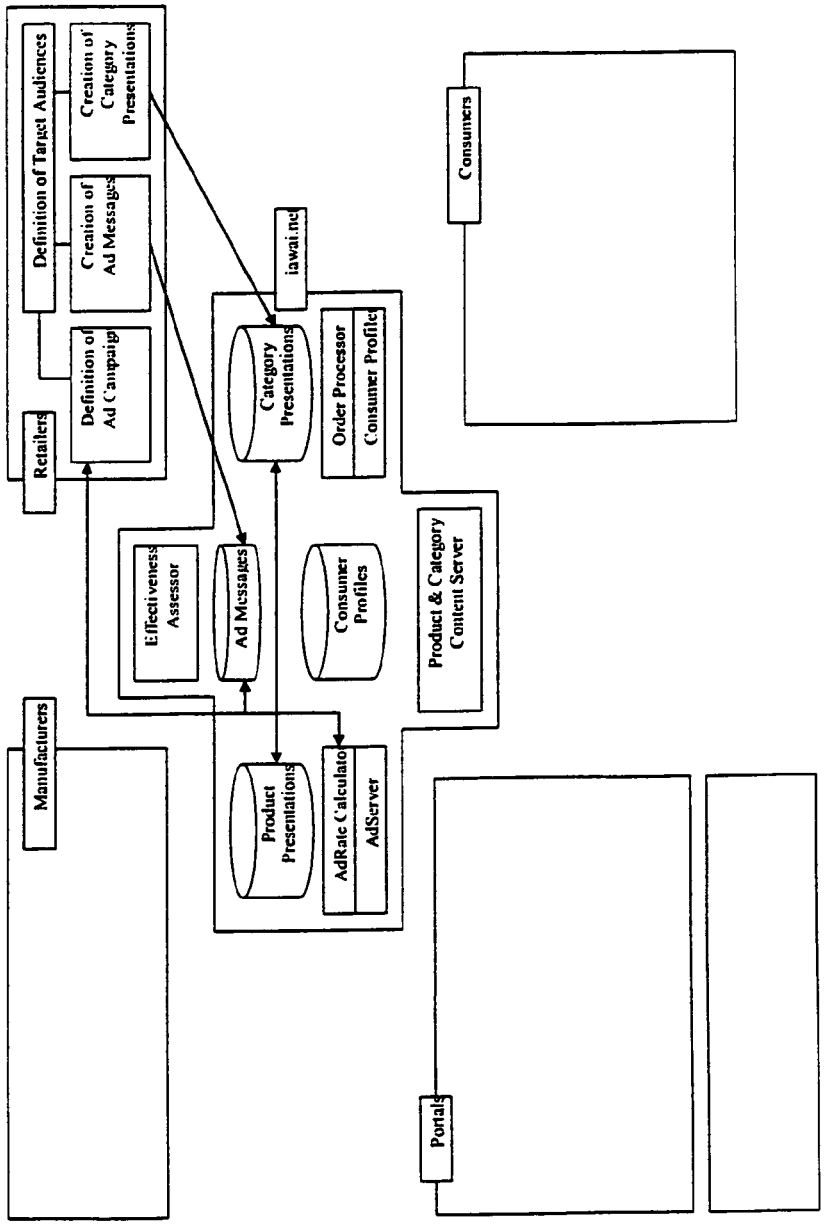
Figure 3a: Data uploading interaction between Retailers and the WebServices System

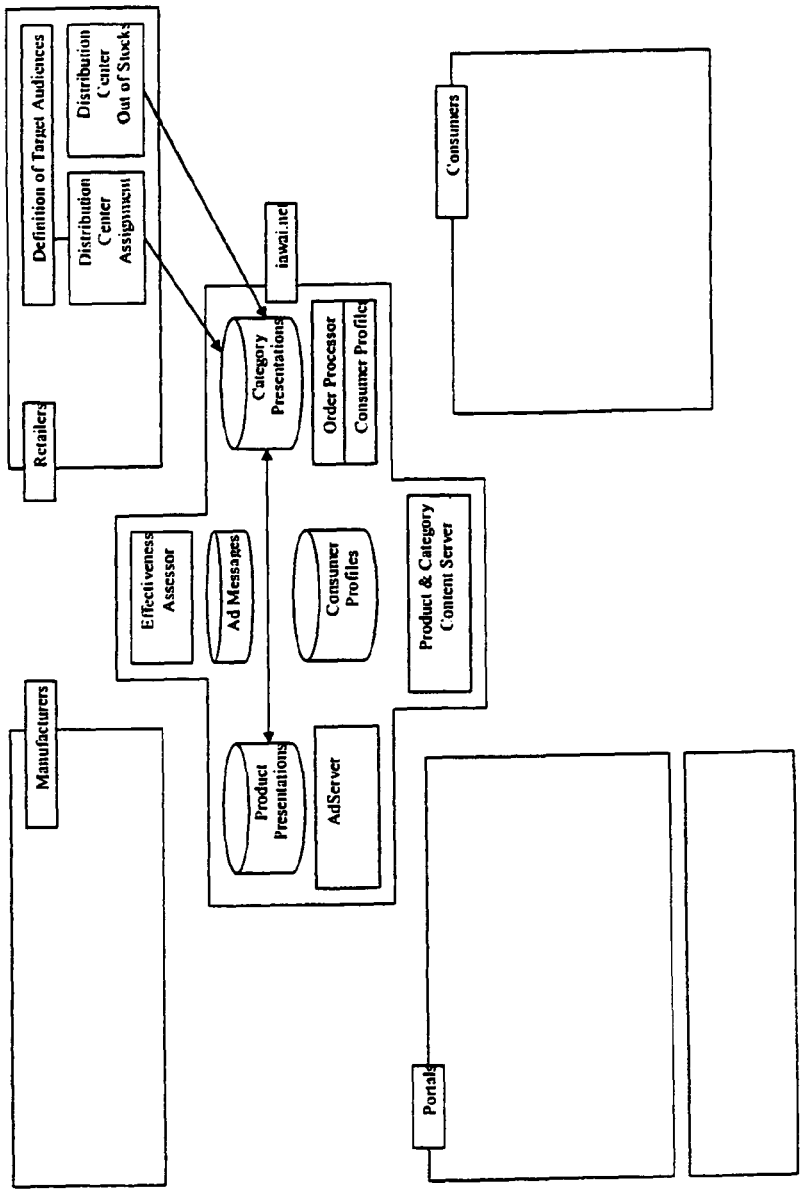
Figure 3b: Data uploading interaction between Retailers and the WebServices System

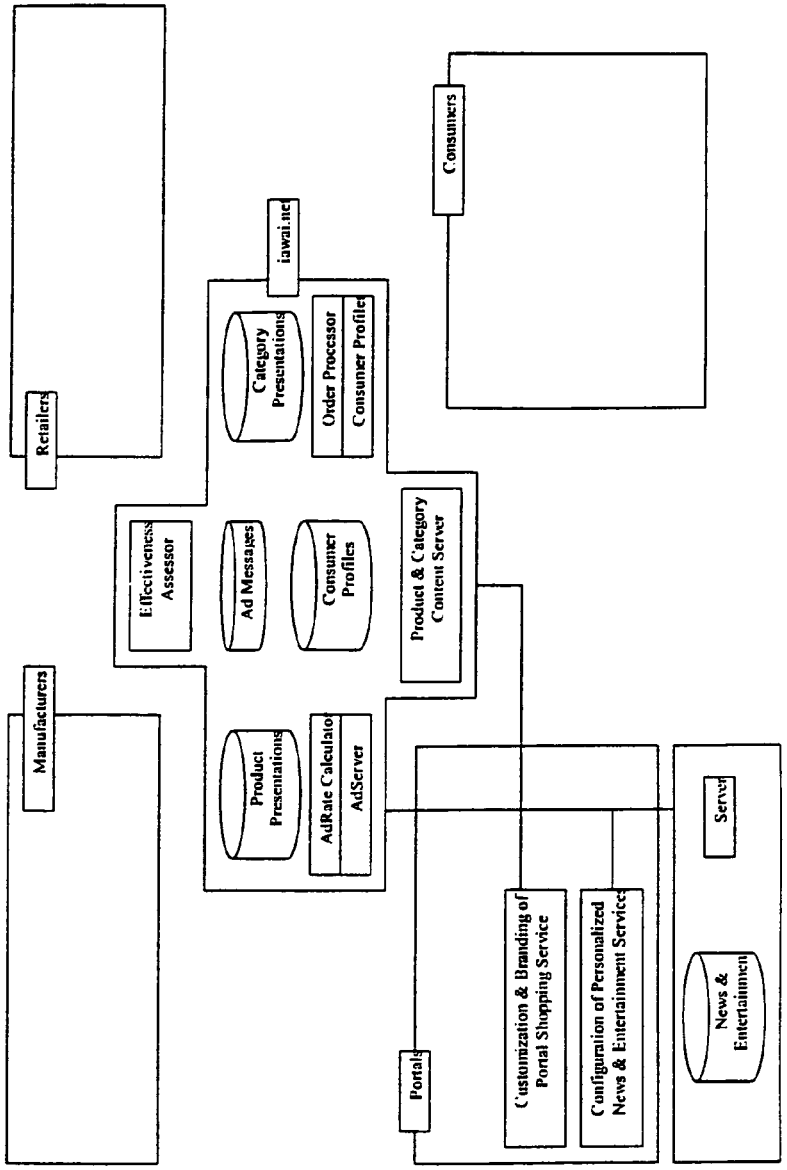
Figure 4: Interaction between Portals and the WebServices System to configure portal specific presentation formats in which product/category data and ads from the system will be sent to consumers

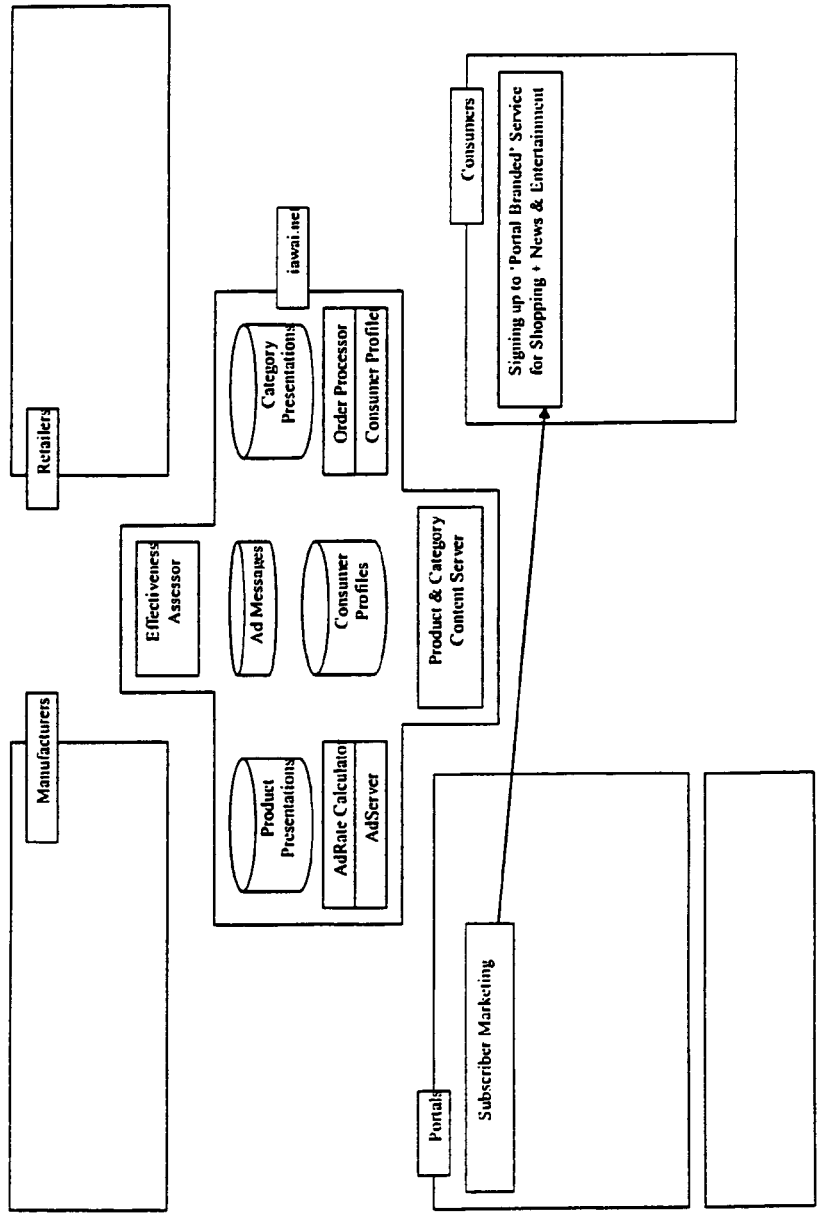
Figure 5: The consumer marketing of the portal branded personal interactive shopping and info/news/entertainment services

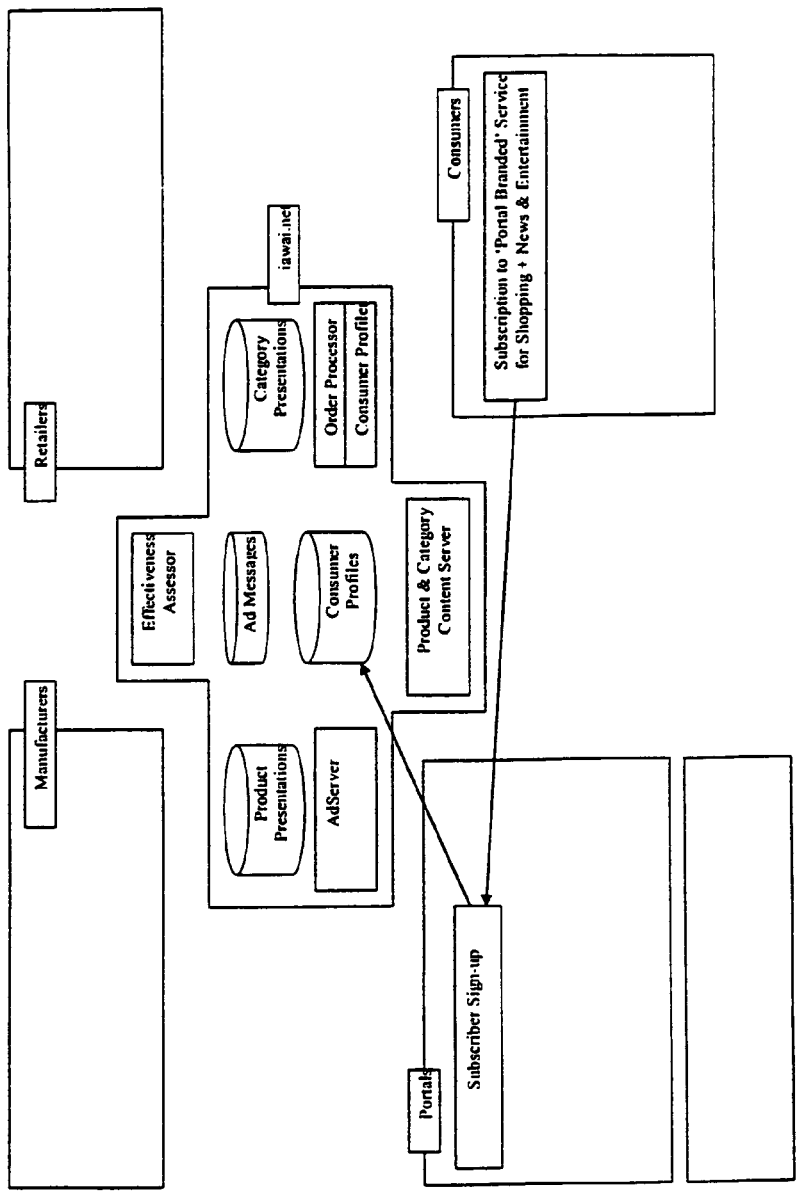
Figure 6a: Subscription management interaction between a consumer, portal and the WebServices System: Subscription Sign-up: Creation of Consumer Profile File

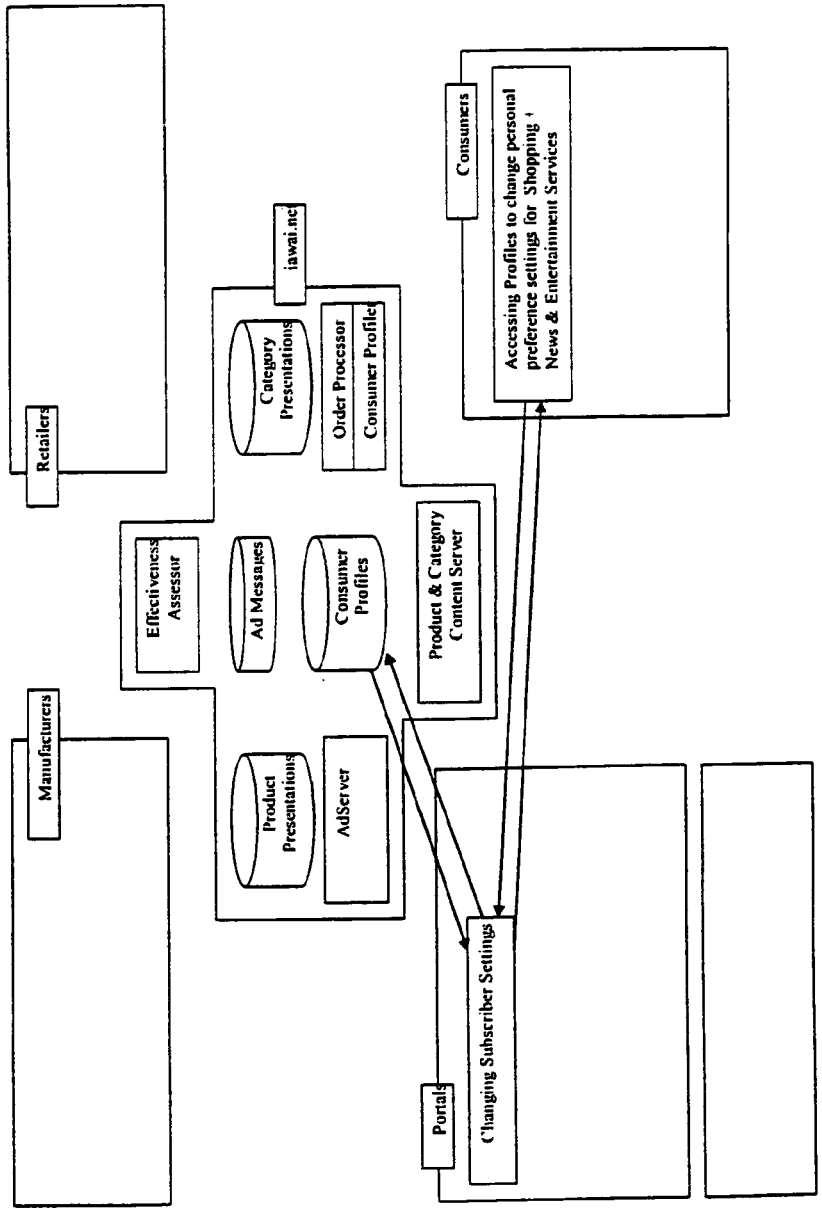
Figure 6b: Subscription management interaction between a consumer, portal and the WebServices System: Changing of Subscriber Settings: Modifying Profile File

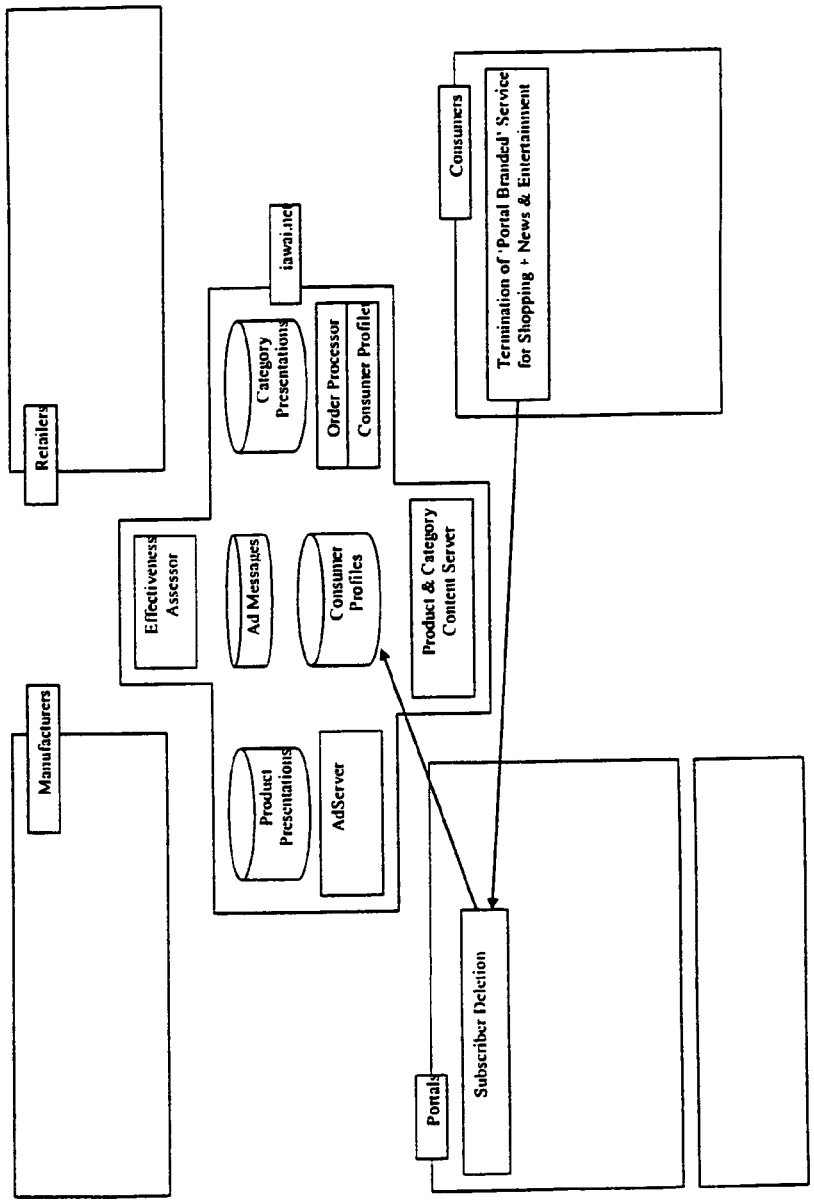
Figure 6c: Subscription management interaction between a consumer, portal and the WebServices System: Subscription Termination: Deletion of Consumer Profile File

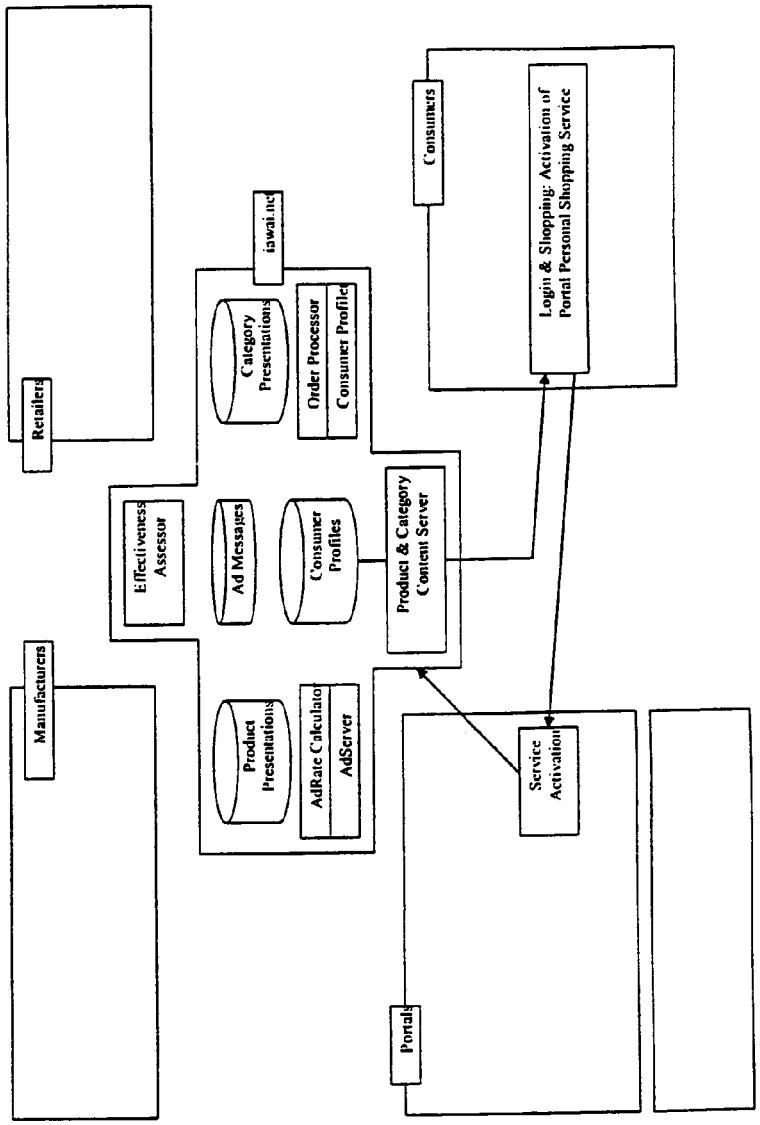
Figure 7a: Consumer Shopping on the WebServices System: 'Portal Branded' Personal Shopping Service login & activation

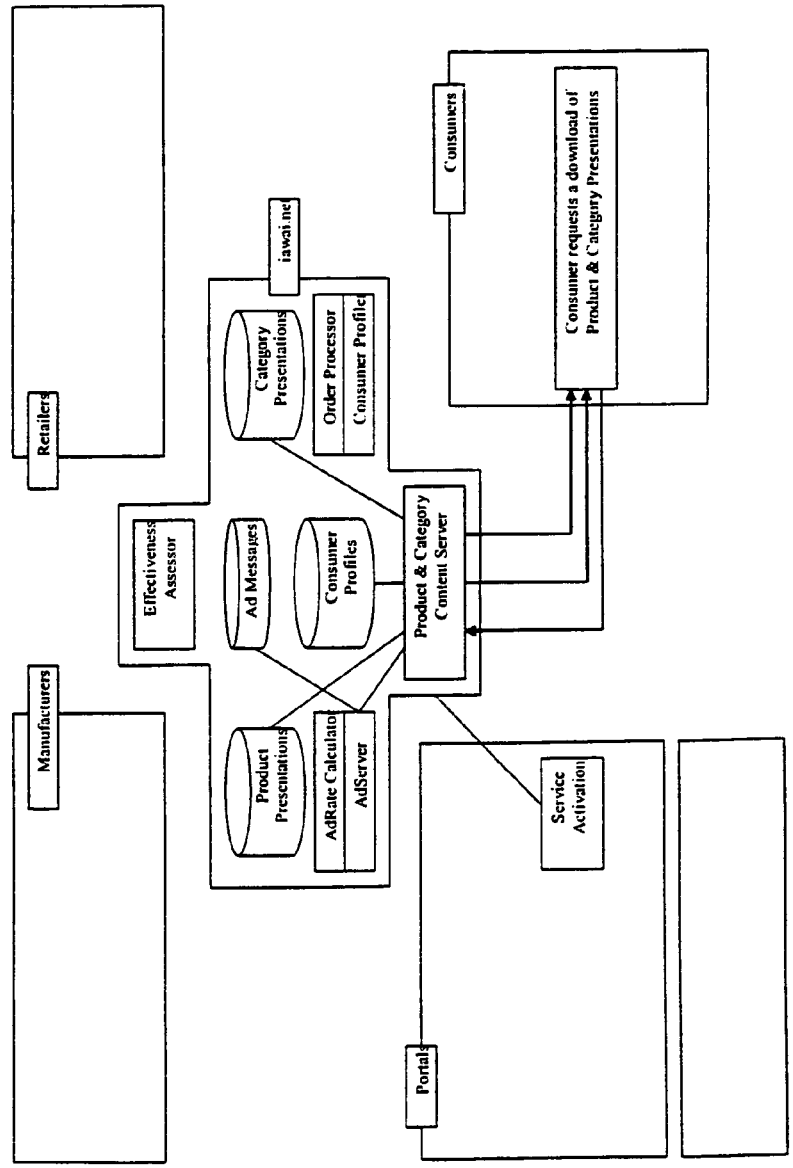
Figure 7b: Consumer Shopping on the WebServices System: Fetching of Product/Category Presentations and Ads Delivery of info/ads in portal specific presentation format

Figure 7c: Consumer Shopping on the WebServices System: Consumer Profile Database is updated with Log File (consumer ID, date, category/product retrieval, ad exposure)
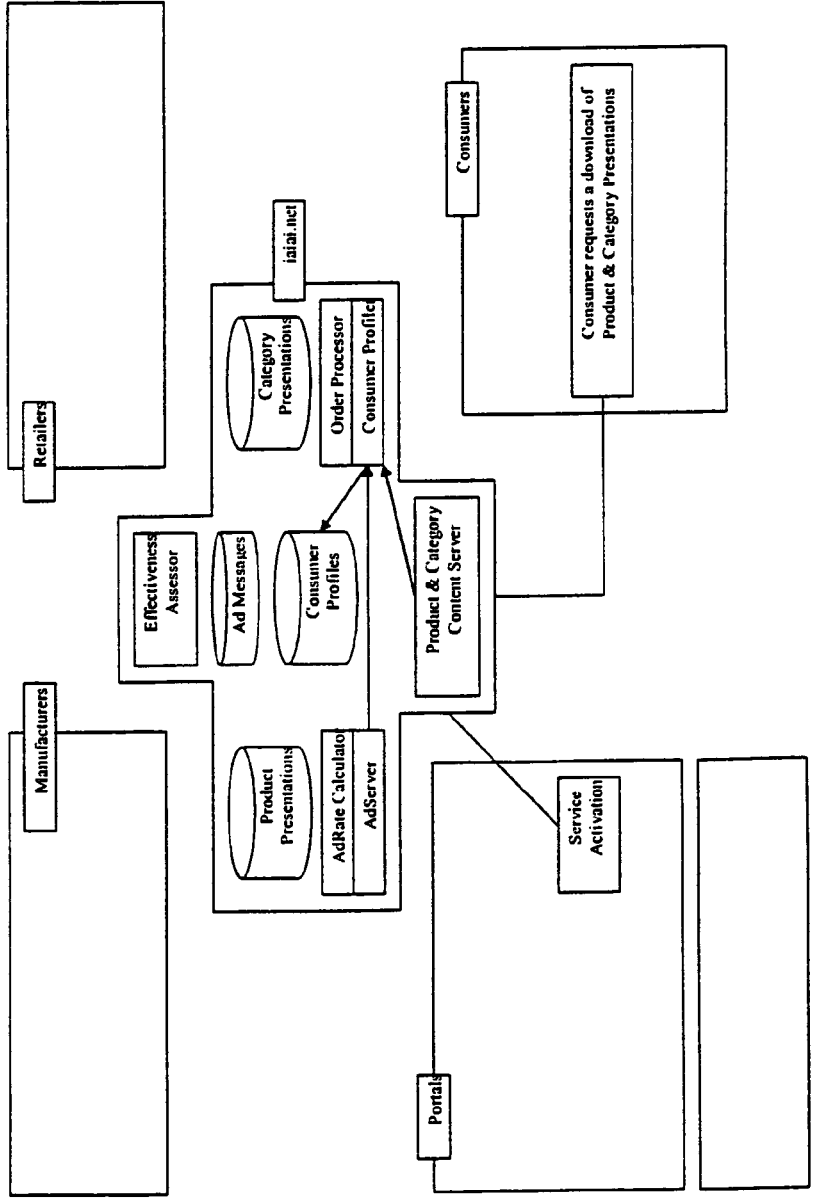

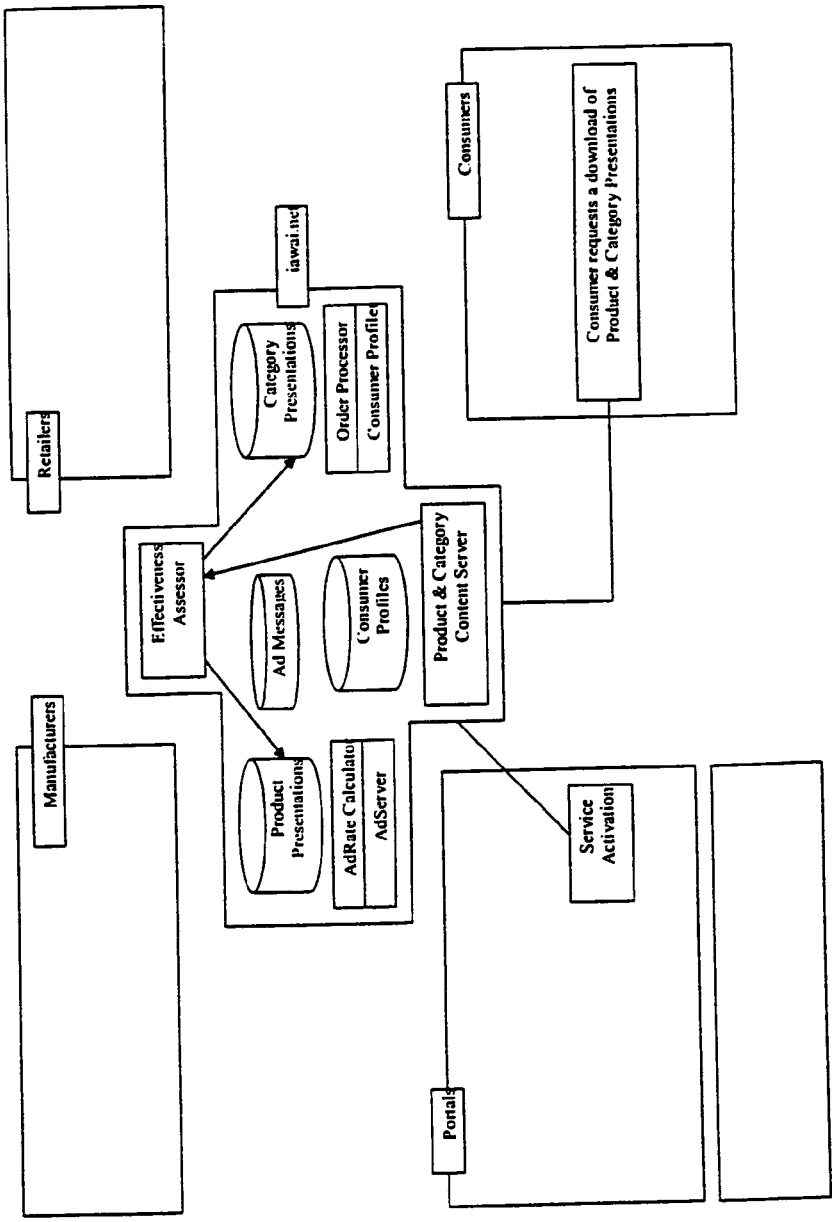
Figure 7d: Consumer Shopping on the WebServices System: Product/Category Database is updated with Log File (consumer ID, date, category/product retrieval)

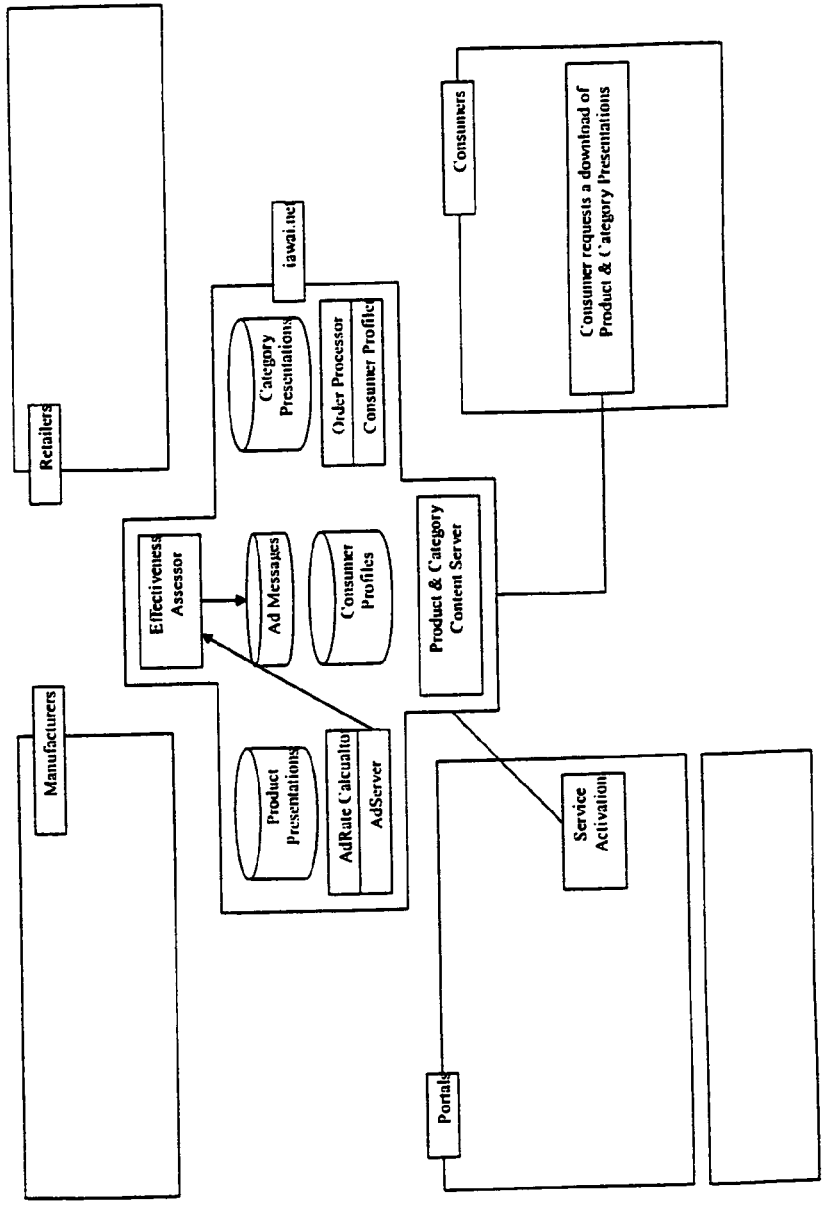
Figure 7e: Consumer Shopping on the WebServices System: Ad Database is updated with Log File (consumer ID, date, ad exposure)

Figure 8a: Processing of on-line consumer orders that are delivered home: Consumer places on-line order, the order processor activates the payments processor, order is paid
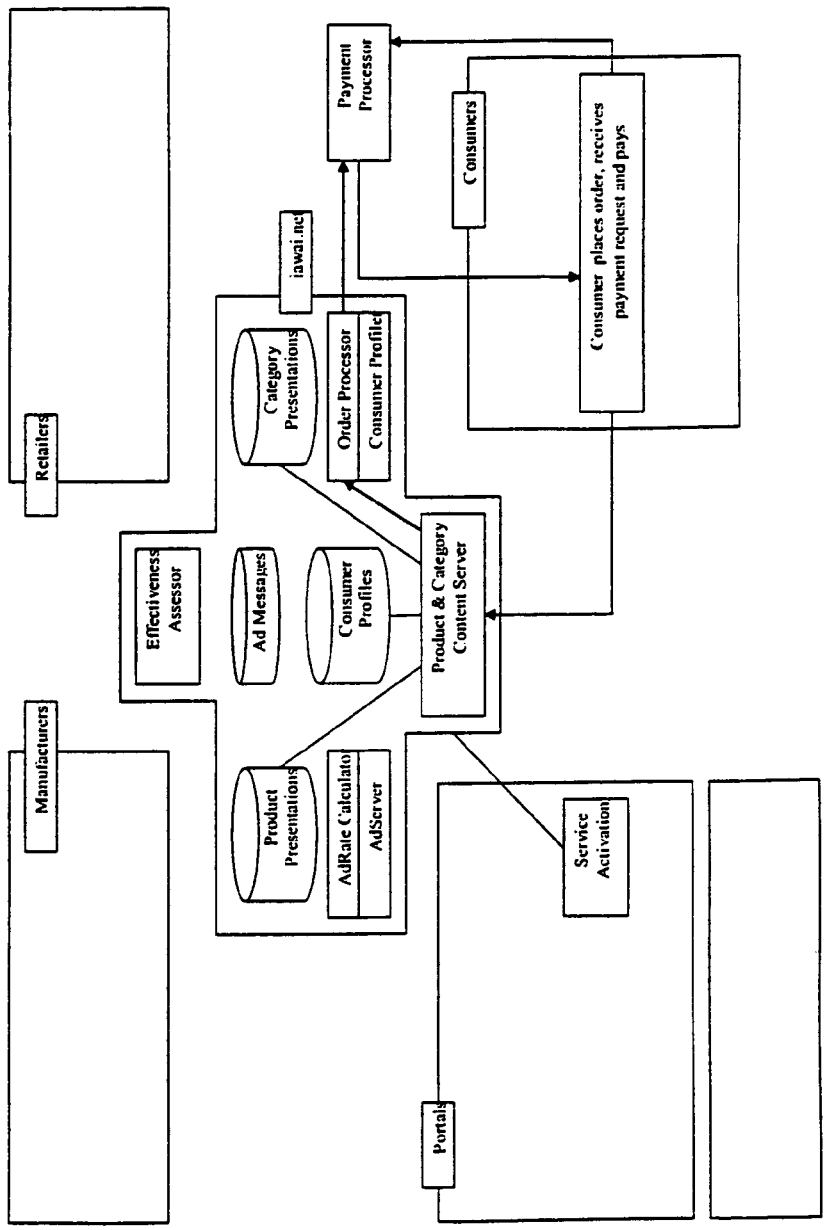

Figure 8b: Processing of on-line consumer orders that are delivered home: Payments processor confirms payment, order is placed at retailer and order confirmation is issued
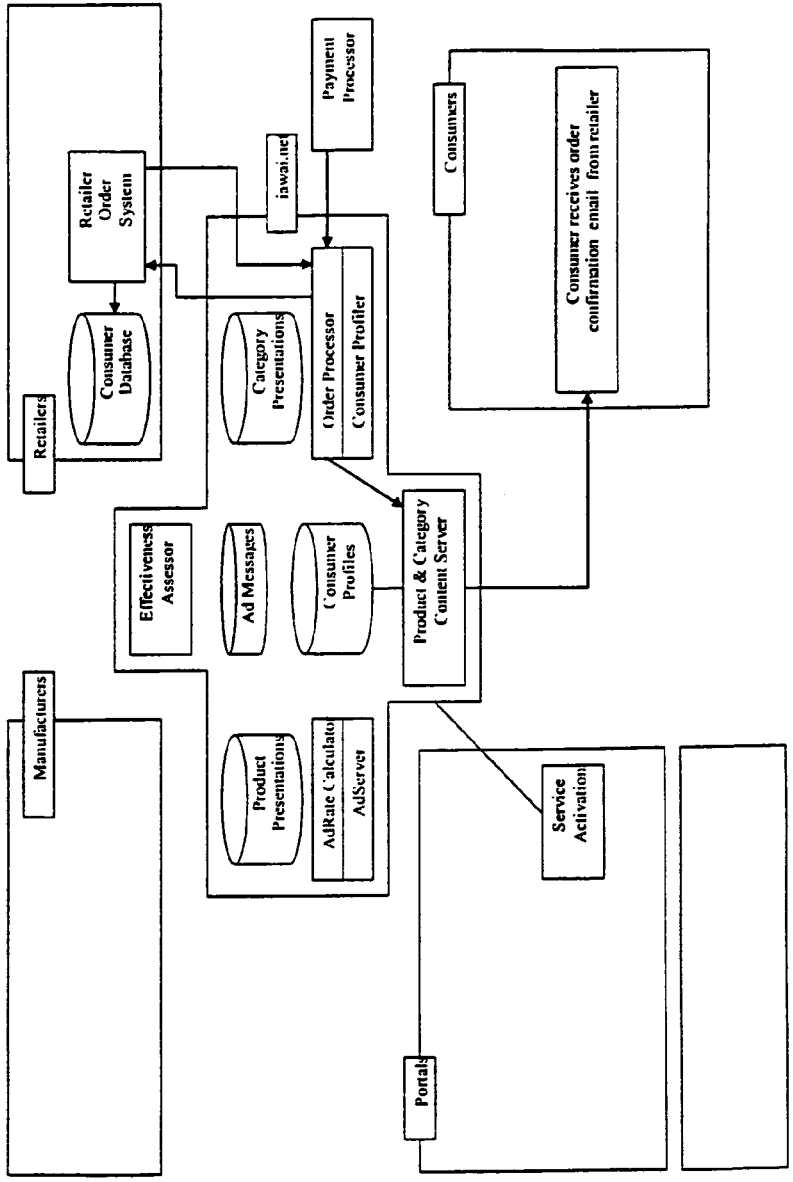

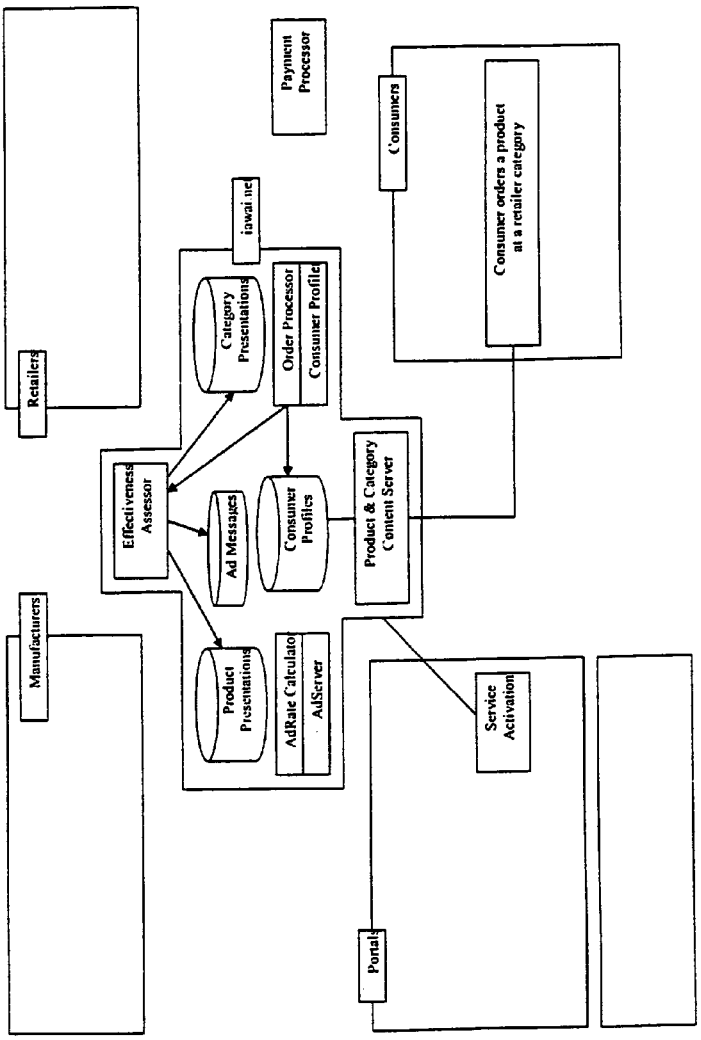
Figure 8c: Processing of on-line consumer orders that are delivered home: Log Files specifying consumer ID, purchased items, purchase date are created to update system databases

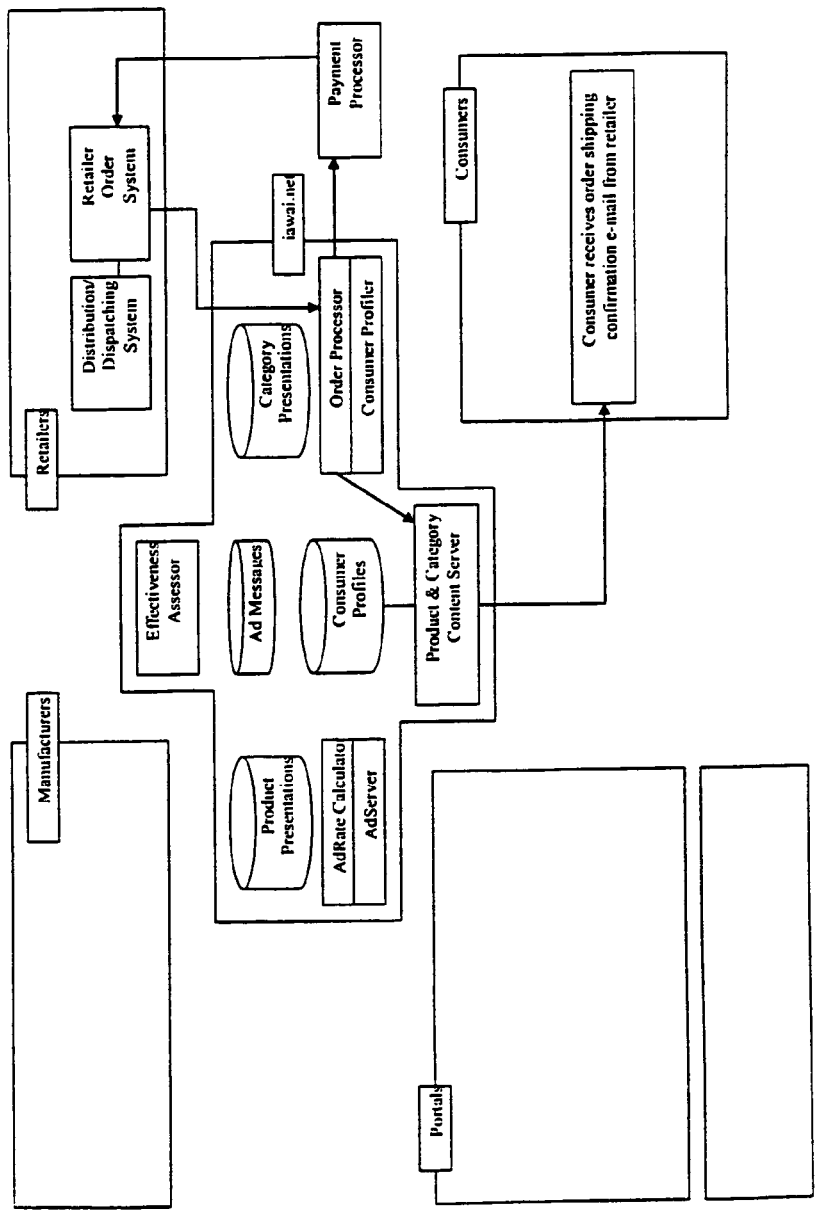
Figure 8d: Processing of on-line consumer orders that are delivered home: Shipping confirmation is issued and sent to consumer and payments are released to the retailer

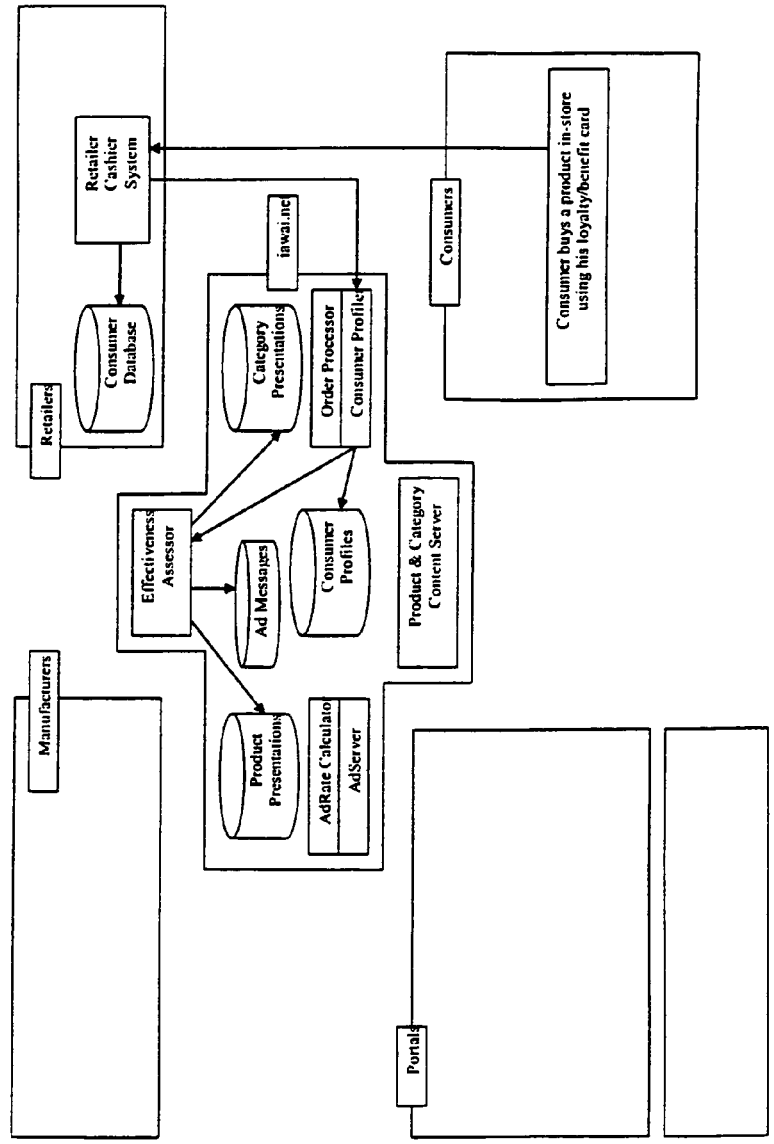
Figure 9: In-store purchases are captured by scanning a benefits card: Log Files specifying the consumer ID, purchased items and purchase date are created and sent to the Consumer Profiler to update the system databases

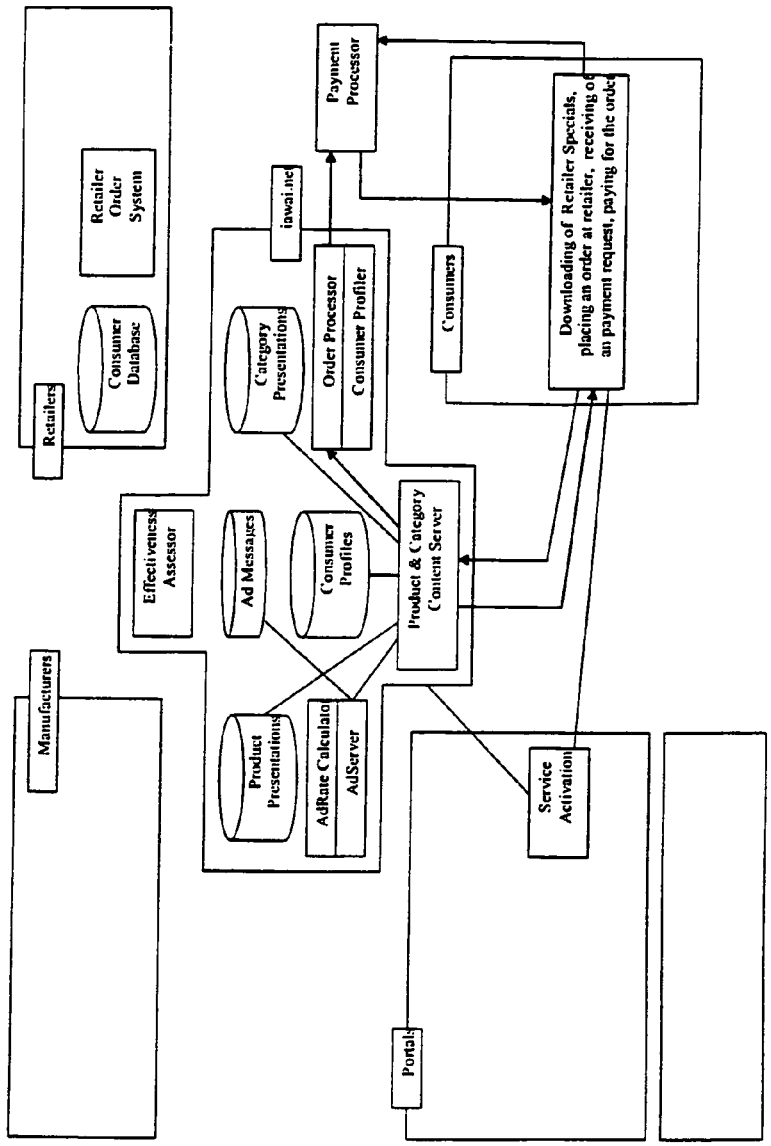
Figure 10a: Processing of 'special price' orders that are picked-up in-store: Consumer consults the 'Retailer Weekly Specials' registry, places an order, upon which the payment processor is activated to receive the consumer's payment

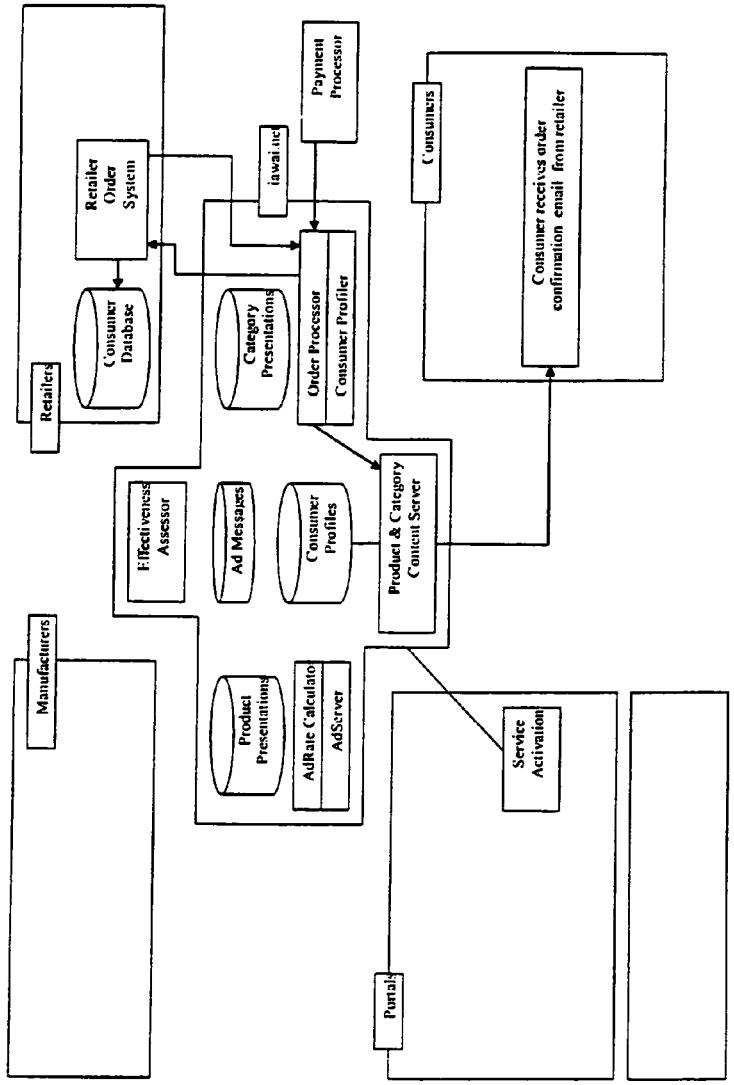
Figure 10b: Processing of 'special price' orders that are picked-up in-store: Payment processor confirms the consumer payment, upon which an order is placed at the retailer and an order confirmation is sent to the consumer

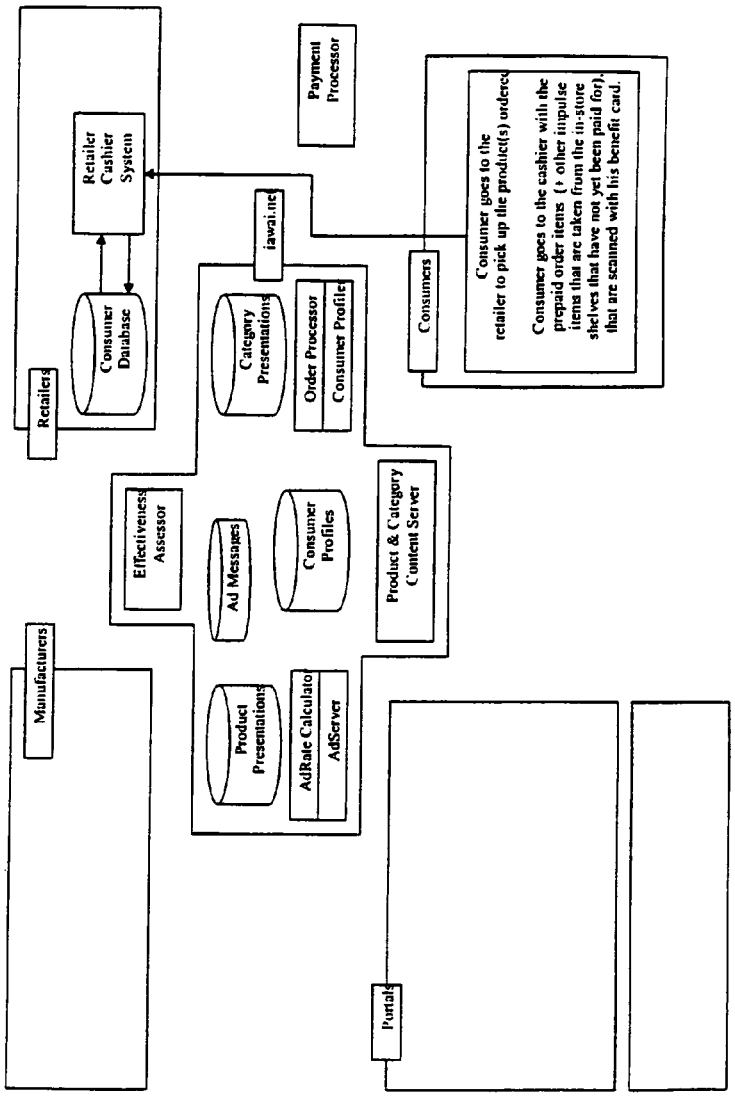
Figure 10c: Processing of 'special price' orders that are picked-up in-store: The consumer goes in-store, picks the pre-paid items alongside other items that he needs and has them scanned at the cashier together with his benefit card

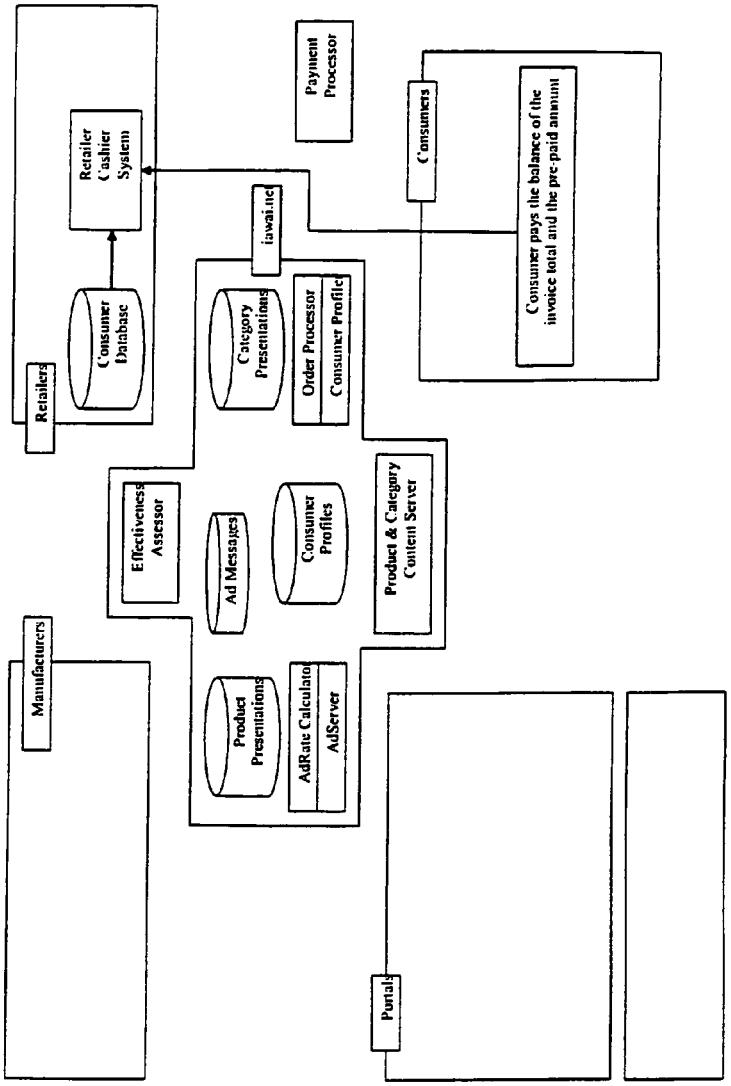
Figure 10d: Processing of 'special price' orders that are picked-up in-store: The pre-paid amount from the pre-paid order is deducted from the total bill of the items that have been scanned and the consumer pays the balance

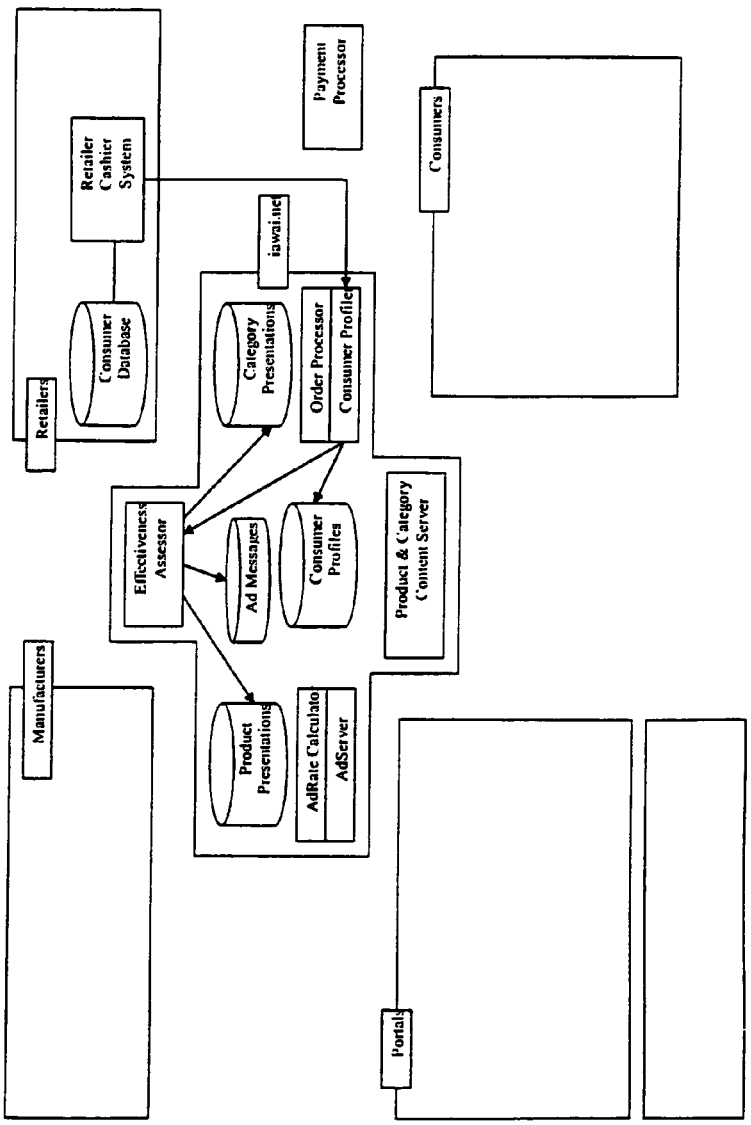
Figure 10e: Processing of 'special price' orders that are picked-up in-store: Log Files specifying the consumer ID, purchased items and purchase date are created and sent to the Consumer Profiler to update the system databases

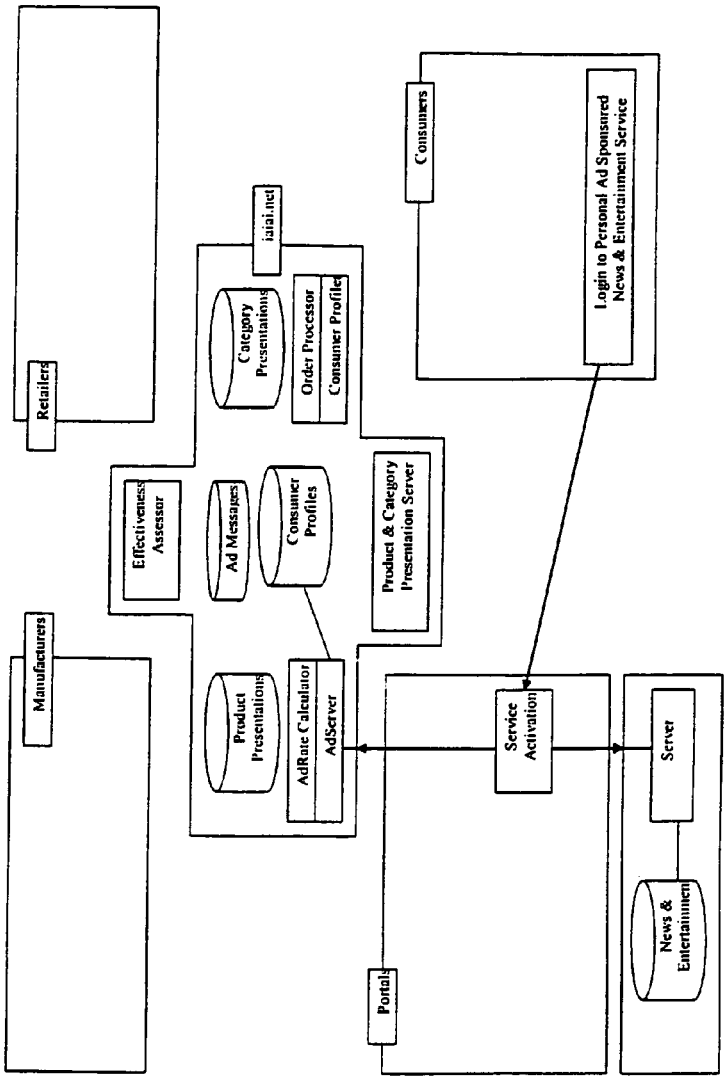
Figure 11a: System functionality to serve ads on the personal info/news/entertainment services of portals: Consumer logs into personal info/news/entertainment service. The portal activates the system's Ad Server

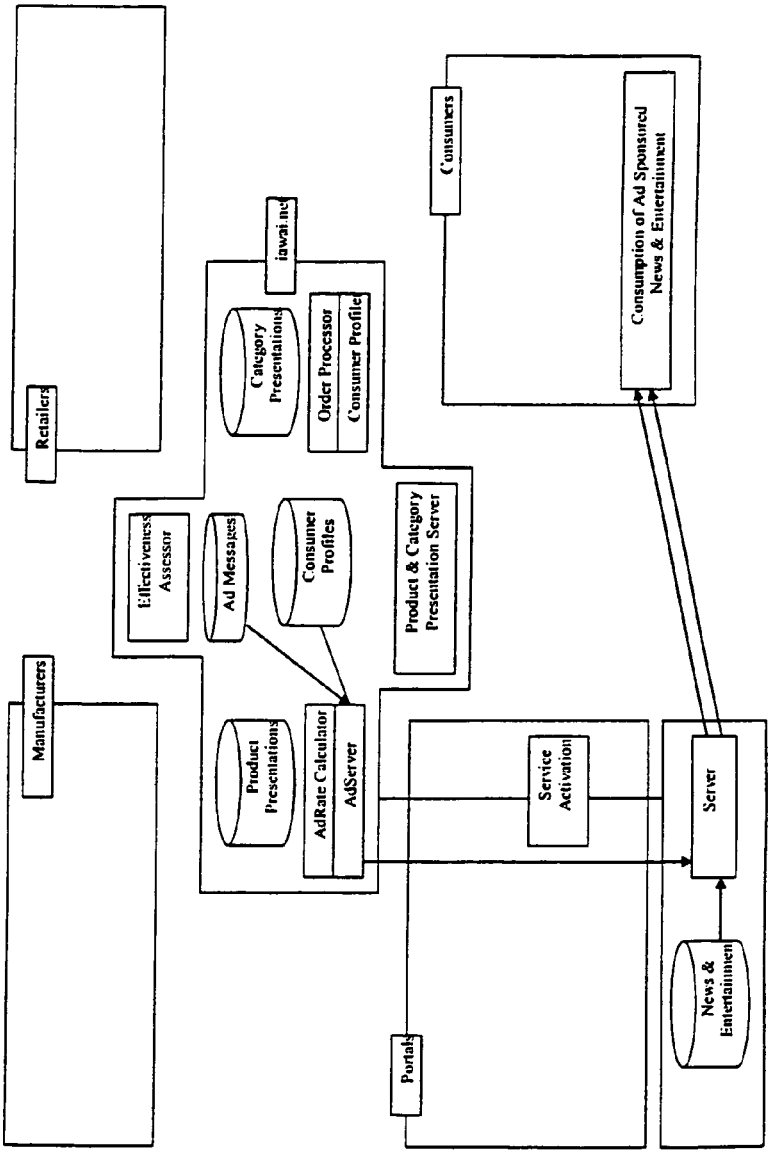
Figure 11b: System functionality to serve ads on the personal info/news/entertainment services of portals:
The system serves those ads, that are relevant to this specific consumer and info/news/entertainment session

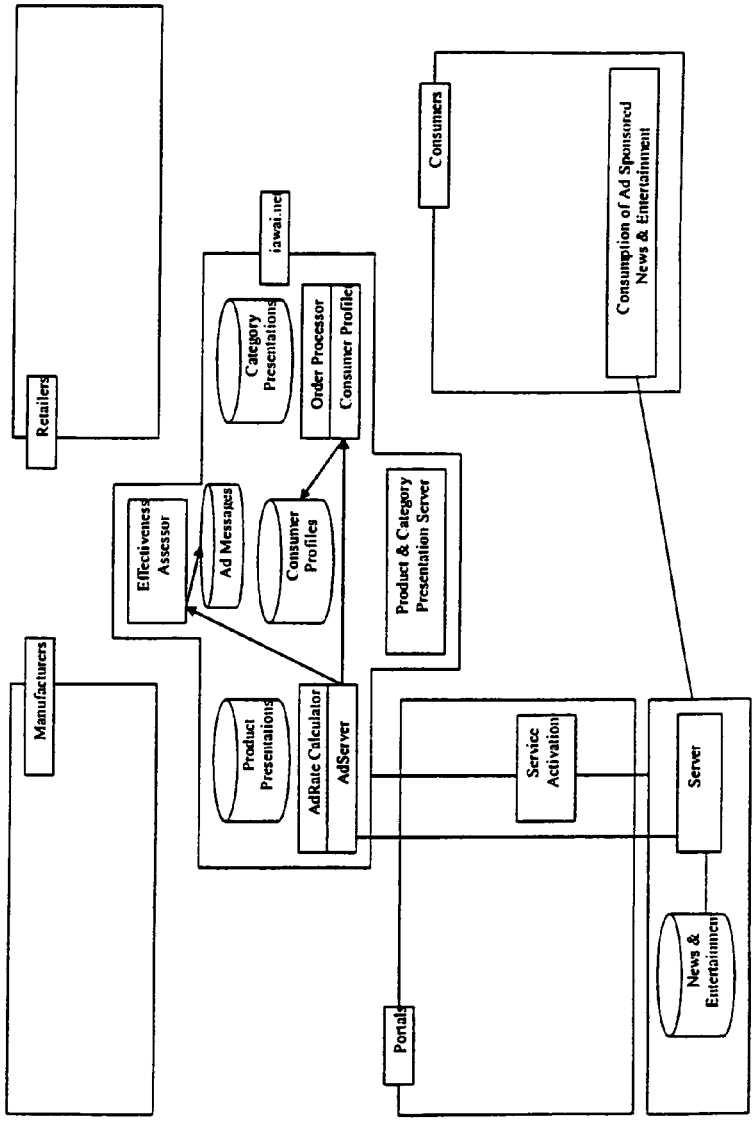
Figure 11c: System functionality to serve ads on the personal info/news/entertainment services of portals: A Log File, linking each 'ad exposure' to an individual consumer is created and processed in the Ad Database

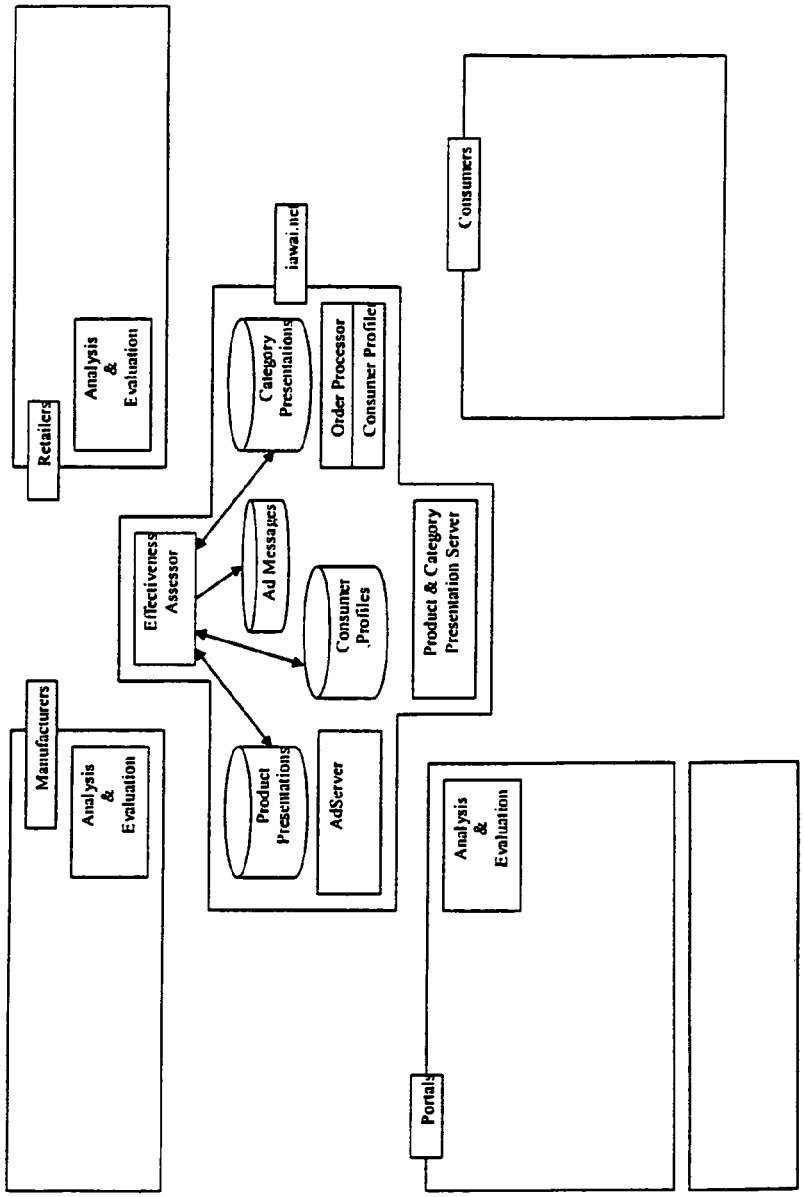
Figure 12a: The system's Target Audience Categorization and Effectiveness Evaluation Benchmarking Run: Batch Run that updates all values on a daily basis

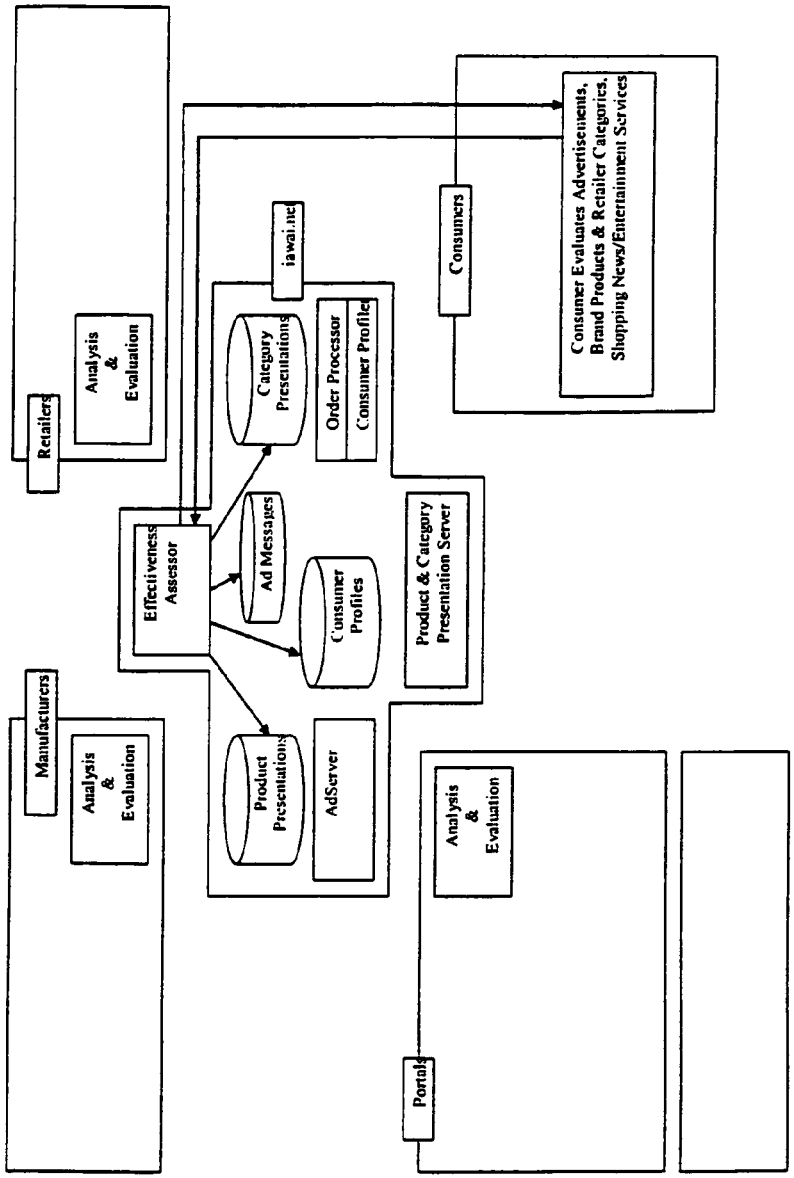
Figure 12b: To evaluate consumer attitudes to ads as well as to product/category presentations the system periodically sents/processes 'e-evaluation questionnaires' to an representative panel of consumers

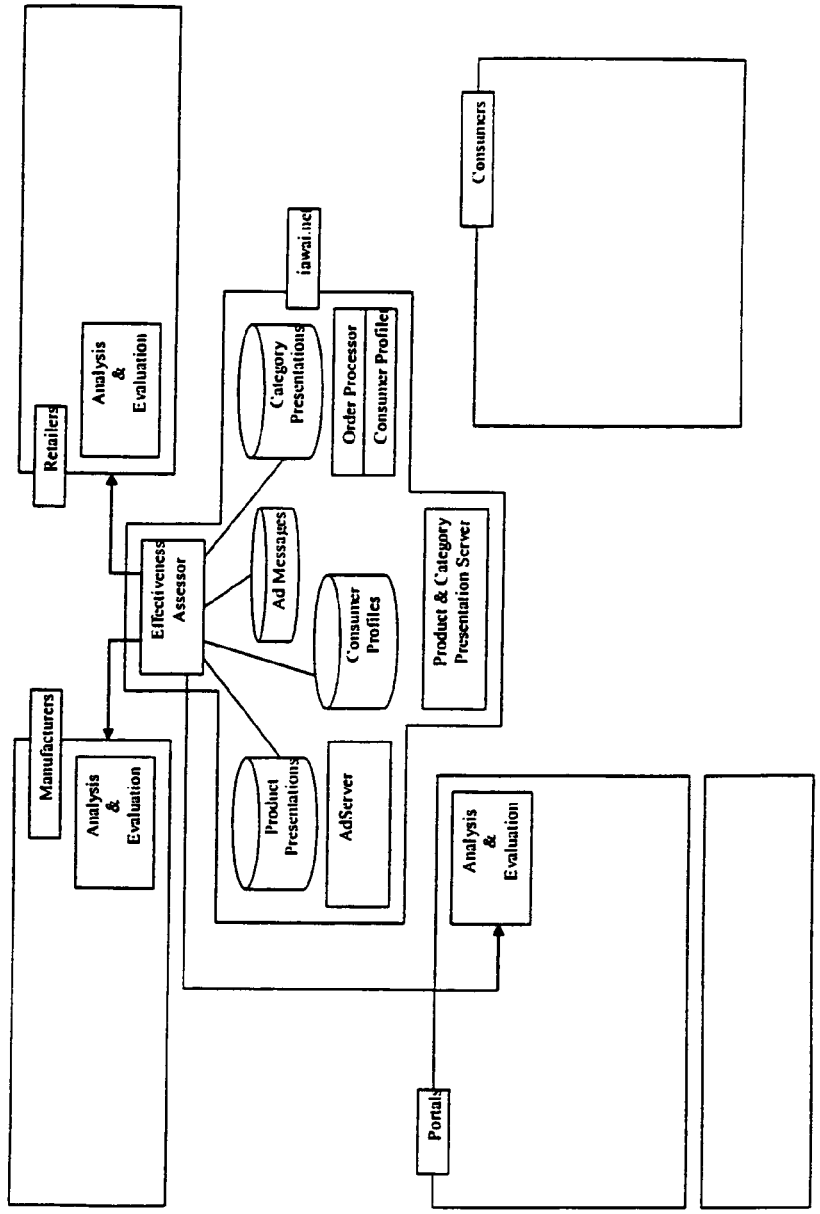
Figure 12c: The system provides each competitor with equal access to information

Figure 13

| Target Audience | Ad | % of contacts | Share increase | Target Audience | Ad | # of contacts | Share Increase |
|---|---|---|---|---|---|---|---|
| Target A | Ad a | 100 | 10% | Target A | Ad a1<br>Ad a2<br>Ad a3 | 100 | 5%<br>15%<br>1% |
| | | | | Additional share growth of 5 ppts. ROI increase of 50% | | | |
| Target B | Ad b | 150 | 11% | Target B | Ad b1<br>Ad b2<br>Ad b3<br>Ad b4<br>Ad b5 | 150 | 5%<br>10%<br>20%<br>15%<br>15% |
| | | | | Additional share growth of 9 ppts. ROI increase of 82% | | | |
| Average share Increase With 'mass' media: 10.6% | | | | Average Share Increase with Iawai.net: 18.0% (1.70) | | | |

Figure 14

| 'Mass' Advertising | | | | 'Personalized' Advertising | | | |
|---|---|---|---|---|---|---|---|
| Target Audience | Ad | % of contacts | Share Increase | Target Audience | Ad | # of contacts | Share Increase |
| category users | we're it! | 100% | 4.4% | category users | | 100% | 8.8% |
| brand users | we're it! | 40% | 8% | brand users | easy usage! | 40% | 10% |
| interested non-users | we're it! | 20% | 4% | interested non-users | try us ! | 20% | 14% |
| non-aware | we're it! | 20% | 2% | non-aware | brand x is.. | 20% | 6% |
| un-impressed | we're it! | 20% | 0% | un-impressed | we're new ! | 20% | 4% |

% share increase 'mass' ads                    % share increase 'personalized' ads

| 8% | 4% | 2% | | 10% | 14% | 6% | 4% |
| brand users | interested non-users | non-aware | un-impressed | brand users | interested non-users | non-aware | un-impressed | ns
MARKETING COMMUNICATION AND TRANSACTION/DISTRIBUTION SERVICES PLATFORM FOR BUILDING AND MANAGING PERSONALIZED CUSTOMER RELATIONSHIPS

CROSS-REFERENCE TO RELATED APPLICATIONS

The present application claims priority to U.S. patent application Ser. No. 10/233,677, filed Sep. 4, 2002 now U.S. Pat. No. 7,158,943, entitled "Marketing Communication And Transaction/Distribution Services Platform For Building And Managing Personalized Customer Relationships," the contents of which are hereby incorporated herein by reference.

FIELD OF THE INVENTION

An interactive marketing communication and transaction/distribution services platform for building and managing personalized customer relationships. The invention provides consumers with privacy, product/retailer (re)search, shopping and ad based personalized info, news and entertainment services, its manufacturing and retailing clients with interactive marketing communication, IT, research support and effectiveness benchmarking services and interactive media and telecom companies with premium advertising, needed to develop profitable ad-based personalized interactive info, news and entertainment services.

BACKGROUND OF THE INVENTION

In recent years, the internet has been recognized as a powerful new medium that potentially can make consumer communication processes more effective. The internet presents an opportunity to build online personalized relationships with consumers. Advertisers have recognized the potential of online advertising, but early experiences with banner ad formats have been disappointing.

Advertisers, however, continue to recognize the internet's potential to streamline their advertising communication processes. It is a medium, that allows to track individual consumer's purchase and shopping behavior and to tailor advertising messages to the individual purchase and shopping needs of consumers, something that is not possible with traditional mass media, where advertising messages are generic, cannot be customized and where purchase behavior cannot be tracked. Further, the internet allows to measure the effect of advertising on consumer purchase behavior. Advertisers, finally, recognize the potential of realizing improved advertising delivery efficiencies that result from moving away from unfocused mass advertising to a more personalized and automated electronic delivery approach, where advertising exposure is confined to sending personalized messages only to those consumers who are potentially interested in the advertiser's product.

However, for a personalized advertising approach to be successful, advertisers need a standardized consumer profiling system that is portal and retailer independent. It is also necessary to develop a standardized consumer feedback measurement system which measures the effectiveness of the advertising portal and retailer independent. Without it, advertisers have to deal with the complexity of a multitude of different profiling and consumer feedback systems. This has proven to be a barrier to achieving the above described vision of 'personalized advertising'.

In general, consumers prefer to browse aggregated retailer or portal websites over individual manufacturer websites when looking for product specific information. Therefore, it would be desirable for manufacturers if via a central system they could directly control their product related information displayed on retailer or portal. Specifically, it would be beneficial if manufacturers could control all the brand product presentations at the different retailer and portal websites, where the product is listed, from one desktop which is located, for example, at the manufacturer's head office. It would also be desirable for manufacturers if via a central system they were to be able to personalize the brand product presentations depending on the language and needs of an individual consumer.

Because manufacturers desire to avoid channel conflicts with their distribution partners, they cannot create distribution channels that compete with them or develop initiatives that risk taking over the retailer's consumer relationships. However, both manufacturers and retailers realize that they have in common that they have the same consumer client. They are gradually recognizing that a collaborative retail/manufacturing selling approach would be financially beneficial to both the retailers and the manufacturers. They are creating joint category management initiatives, collaborative IT platforms that automate 'Planning, Forecasting and Replenishment' processes and electronic data exchange systems between retailers and manufacturers. Both parties are also more frequently exchanging their consumer data.

In addition to the above, retailers are increasingly recognizing the potential of the internet as a new distribution channel that can improve the efficiency of their store operations and provide consumers with the convenience of home shopping and delivery. Thus, many such retailers have begun acquiring e-commerce competencies by either purchasing upstarts or building up expensive e-commerce organizations and systems themselves. The necessary information technology (IT) and marketing resources are a great financial burden for those retailers, who are traditionally accustomed to small margins and relatively low IT and marketing expenses.

Due to the lack of standard communication protocols between retailers and manufacturers, the process of building a retailer website is still very inefficient. Each retailer must independently build up category presentations. Further, each retailer must also build product presentations relating to the manufacturer's products which are listed in the retailer's on-line store. Traditionally, each retailer has been responsible for their in-store category presentations. However, the actual product brand presentation was a function, that was traditionally handled by the manufacturer via packaging and mass advertising. It is apparent that taking over this product brand presentation function from the manufacturer is very labour intensive for retailers. It is also evident that manufacturers are hesitant to relinquish control of the online presentation of their brands to the retailers. Thus, retailers need to assess whether their internet business will be able to absorb these additional in-house overhead costs or whether it is more practical to organize collaborative selling processes to outsource these non-core functions to manufacturers and or to IT (information technology) and marketing services specialists, that will be able to perform these tasks better and at lower costs.

There are currently software packages which are less expensive and perform better then the in-house developed store front and website systems described above. However, the marketing knowledge needed to use the personalization features of these software packages is still missing in these retailing companies. Thus, the communication potential of these systems is not being fully exploited. Adapting manufacturer brand presentations and retailer category presentations to individual consumer needs is a complex task. One way of simplifying the retailer task would be for the retailer to assume the retailer category presentation personalization function and to leave the product brand personalization function to the manufacturer. Such a collaborative approach would allow retailers to construct their categories from product brand presentations stored in a central database. This would make the process of creating retailer presentations more efficient. Further, this approach would ensure that the retailer category presentations would contain the latest product brand descriptions as well as product brand descriptions, that are automatically adapted to the needs of individual consumers.

For retailers, it would be ideal if, from one desktop at a head office for example, they could build the retail category presentations from the product brand descriptions stored in a central database and have the system personalize these product brand presentations depending on the language and needs of the consumer. A collaborative approach on a central platform would lower IT investments as it would avoid the need for each individual retailer to establish separate IT systems that link with its various manufacturers. A collaborative system with a central product presentation database and a standardized consumer profiling and purchase behavior tracking system would further avoid the need to define separate consumer profiles and feedback information protocols required for the exchange of consumer data between retailers and manufacturers, as well as make it possible to measure and to benchmark the effectiveness of brand and retailing presentations against each other. Absent a central product presentation database and a standardized profiling and consumer feedback system, separate consumer profile and feedback information protocols would have to be defined for each manufacturer-retailer relation, greatly reducing the benefit impact of the collaborative approach as well as its chances of success.

Traditionally, web portal designers have been successful in creating convenient and interesting content and information services, but most of them have failed to turn their efforts into a profit. As a result, most portals operate at a loss. Many portals have attempted to rework their business model, which has largely been dependent on banner advertising revenues. One solution which was proposed included using consumer-paid subscription models for interactive personal information, news, music and entertainment services. However, it is difficult to convince consumers that they should start paying for a service, which until now has been free. Other efforts by portals included requesting that manufacturers and/or retailers pay the portals for displaying their product brand and/or retail category presentations. Some have incorporated comparison shopping services that compare products based on price. These services do not have the support of manufacturers and/or retailers, who refuse to pay the portals for these services.

For interactive personal information, news, music and entertainment services to become profitable and to be able to compete against the classical mass media, like tv, radio, and print, it would be desirable to exploit the internet's personalized advertising delivery capabilities, which traditional mass media and its advertising cannot offer. To justify premium rates advertisement messages must be personalized. However, without a standard profiling and segmentation system for profiling consumers and measuring advertising impact on consumer purchase behavior, these new interactive media will not gain the acceptance of advertisers.

Telephone and cable companies have invested heavily in broadband and in third generation (3G) wireless infrastructure development. The telephone and cable companies hope to recuperate their investments through broadband information, news, music and entertainment services. Subscription-based models are one possible way for these companies to recuperate their investments. However, the consumer cost for these services is extremely high. Ad-based models, which are based on premium personalized ad messages, are another option for telephone and cable companies. This option reduces the cost to the consumer. For interactive information, news, music and entertainment services to be able to compete against the classical mass media, like tv, radio, and print, for example, it will would be desirable to develop and exploit personalized ad delivery capabilities, which is something that mass media cannot offer. To exploit these capabilities, advertisement messages must be personalized. However, again, without a standard profiling and segmentation system for profiling consumers, these new interactive services will not gain the acceptance of advertisers.

Premium ad-based models are only possible with a standard portal and retailer independent system for profiling the consumers that use these services as well as a standard portal and retailer independent system for measuring the impact of its advertising on consumer purchase behavior. Without it, individual personal information, news, and entertainment service would have incongruous segmentation, profiling, and measurement systems. As a result it is unlikely advertisers will be able to efficiently target their messages nor track the effectiveness of their advertising investments.

In addition to a need for standardized consumer, manufacturers, retailers, and portals need to consider the consumer's concern about their privacy. Consumers are aware that their behavior on the internet is registered and this is generally seen as unpleasant. In addition, consumers are also bothered by consumer address companies which send irrelevant messages commonly known as "spam" messages. These consumer address companies collect consumer profiles but do not reward consumers for providing this information. If consumers shopped at an aggregated shopping service that protects and respects their privacy, the above-mentioned privacy concerns would be greatly eliminated. Consumers could store their shopping needs and preferences on one central location and could maintain control over this information. Because this service could ensure that it would not sell and/or relay individual consumer profiles to third parties, the consumer could avoid receiving unwanted advertisements or messages. In exchange for this privacy guarantee, as well as other possible benefits, the consumer would permit their shopping habits and preferences data to be processed into valuable information which allows retailers and/or manufacturers to improve their product and/or category offers and to personalize their advertisements so that they are more relevant to the consumer.

Further, it is very inconvenient for consumers to repeatedly enter their shopping needs at different websites. An aggregated holistic profiling system, that creates a single consumer profile that captures a consumer's complete purchase and shopping behavior is preferable over a multiple of individual retailer systems that each capture only a part of the consumer's purchase behavior. This single profile would benefit the consumer and advertisers, as it would enhance consumer's shopping convenience as well as advertising impact by making advertising messages more relevant to consumers.

SUMMARY OF THE INVENTION

The system of the invention addresses the above described problems by providing a collaborative interactive system.

According to an embodiment of the invention, a multilingual collaborative interactive marketing communication and transaction/distribution services platform is provided for building and managing personalized customer relationships. The platform of the invention preferably provides consumers with privacy as well as product and retailer related research and shopping services. In addition, the platform provides consumers with ad-based personalized info, news and entertainment services, provides manufacturers and/or retailers with interactive marketing communication and research support and interactive media and telecom companies with premium advertising, needed to make their personalized services profitable.

The platform of the invention includes a central database of product and retail information and holistic consumer profiles, generated by a consumer profile generator based on the historical purchasing preferences and habits of each consumer. The holistic consumer profiles are preferably constructed by registering or recording the information consumers retrieve from the central product and retail information database, as determined by parsing log files of the consumer's online behavior as well as by capturing purchases made both on-line and in-store, using a loyalty card. The central product and retail information database is preferably independently fed and managed by each participating manufacturer and retailer. The central product and retail information databases may be accessed by consumers independent of the portal site that they are using for their shopping activities. The information retrieved from these databases is sent to the consumer in a portal specific presentation format with special slots for including customized advertising messages as well as the brand name of the portal that is providing the service to the consumer.

The holistic consumer profiles are created by capturing consumer purchase behavior and preferences for the largest possible range of product brands, categories, and retailers. The holistic purchase-behavior specific consumer profiles allow manufacturers and/or retailers to customize their product and category presentations to reflect an individual consumer's needs, independent of the portal that the consumer is using and independent of the retailer where the consumer is purchasing. The consumer profiles also allow manufacturers and/or retailers to reach their consumers, by placing consumer customized purchase-behavior specific advertising messages on the consumer's personalized interactive shopping and ad sponsored info, news and entertainment services. Advertisers may customize their advertising messages on these services to reflect individual consumer's purchase and shopping needs, independent of the portal that the consumer has been using and independent of the retailers where the consumer has been making purchases.

By sponsoring content delivery with premium, customized advertising messages, it is possible to decrease the consumer's price for such services. Consumer's receive such services in return for consumers accepting the advertising exposure as well as agreeing to the registration of their shopping and purchase behavior, in a way that provides consumers with full control over their profile data and that permits this data to be processed into aggregated retailer and portal independent consumer feedback information, that can be automatically processed and channeled back to manufacturers and/or retailers. The processing of data allows manufacturers and/or retailers to receive portal and retailer independent information about consumer's needs as well as information that permits manufacturers and/or retailers to benchmark their different product and/or category presentations and customized ad messages against each other, thus enabling them to evaluate the effectiveness of their communication programs, assortments and products.

The system of the invention allows portals to be compensated for their personalized content services and their customer databases. Portals may receive premium advertising revenues based on the amount of personalized ads that are being displayed on the portal's personalized information, news and entertainment services and in the advertising slots on the portal's personal shopping pages, that display the product and/or category presentations that the portal's consumers retrieve.

In a preferred embodiment, the system of the present invention includes a central database system in electronic communication with a manufacturer, a retailer, and a portal. The central database system may include a product presentation database, a consumer profile database, a category presentation database, a product and category presentation server, an ad message database, an ad rate calculator, an ad server, a consumer profile processor, an order processor, and an effectiveness assessor processor. The ad server is preferably configured to transmit personalized purchase-behavior specific and/or context-sensitive advertisements in response to a request from the portal, consumer, or user of the system.

The product presentation database is populated with product information transmitted from the manufacturer, or retailer, to the central database system. Also, the category presentation database is populated with product information transmitted from the manufacturer or retailer to the central database system.

When determining when and what type of ad to serve, the ad server generates a personalized purchase-behavior specific or context-sensitive advertisement based on information stored in the consumer profile in the consumer profile database. Most often, the user or consumer using this system will be connected via a user terminal in electronic communication with the portal, or a distributed network such as the internet, enabling the personalized purchase-behavior specific or context-sensitive advertisement to be transmitted to the consumer.

The process by which the present invention is useful for increasing the effectiveness of advertising effectiveness includes 1) collecting data for a consumer indicating online shopping information retrieval and online and offline purchasing history and preferences; 2) generating a consumer profile from the above data; 3) storing a plurality of advertisements in an ad database; 4) selecting an advertisement from the ad database based on the consumer profile; 5) serving the advertisement to the consumer via a distributed network; 6) monitoring the shopping and purchase behavior of the consumer after exposure to the advertisement; and 7) calculating the effectiveness of the advertisement based on consumer purchase behavior. Preferably, the process also includes updating the consumer profile after the consumer has been exposed to the advertisement.

In an alternative embodiment, the process by which the present system is useful for increasing the effectiveness of product and category presentations includes 1) uploading a product presentation or category presentation to a product/category presentation database; 2) storing a plurality of advertisements in an ad database; 3) selecting a product or category presentation from the product/category presentation database based on the consumer profile; 4) serving a product presentation or category presentation in a portal specific format to a plurality of online consumers; 5) selecting an advertisement from the ad database based on the consumer profile; 6) serving the advertisement to the consumer via a distributed network; 7) monitoring the shopping and purchase behavior of the consumer after exposure to the product presentation, category presentation and advertisement; and 8) calculating the effectiveness of the product presentation, category presentation and advertisement based on consumer purchase behavior. It is also desirable to update the consumer profile after the consumer has been exposed to the product presentation or category presentation.

In another embodiment of the system of this invention, there is a central standardized database, comprising product brand presentations and retail category presentations, wherein the product brand presentations and retail category presentations are uploaded and updated by a participating manufacturer or retailer, and a log file database including requests by consumers to access the product brand presentations and retail category presentations and the advertisement contacts to which the consumer has been exposed. The database may further comprise a holistic consumer profile, wherein the holistic consumer profile includes the consumer's historical shopping and purchase behavior and preferences.

The present invention is also useful as a system for serving consumer purchase-behavior specific online product and retailer content. The process by which this system is carried out is as follows: 1) creating a holistic user purchase behavior specific profile for a consumer; 2) determining, based on the holistic purchase behavior specific consumer profile, product and retailer content which most closely matches the preferences or needs of the consumer; and 3) serving the product and retailer content to the consumer in portal specific presentation format. Preferably, the product and retailer content is selected from advertisements, product presentations, and category presentations.

While in operation, the process by which the present system is carried out may also include any of the following, or combinations thereof: logging the consumer's shopping and purchase behavior response to the product and retailer content, updating the consumer's holistic purchase behavior profile, based on the consumer's response to the content, assessing the effectiveness of the content, based on the shopping and purchase behavior response of a plurality of consumers to the product and retailer content, transparently calculating advertising rates, based on the effectiveness of the product and retailer content to influence consumer purchasing behavior, and generating in-store traffic by providing the consumer with advertising and or promotional incentives to purchase a product via an online advertisement, product presentation, or category presentation; accepting online payment for the product; and delivering the product to the consumer at an offline retail store; forwarding advertising and or promotional incentives to consumers based on their holistic consumer profile, when the holistic consumer profile indicates that the consumer is more likely to purchase a product having a discounted price.

In accordance with one aspect, the present invention is directed to a process for improving communication effectiveness between manufacturers, retailers and individual consumers and making information exchange easier. This first aspect includes the following steps:

Data indicating shopping and purchase behavior history is collected for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system. The collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected indicating advertisement exposure history for each of the individual consumers by logging advertisements served to the consumer along with ad-sponsored content, and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and sales made by the plurality of retailers of the products featured in the product presentation database and the retailer category presentation database, and data indicating advertisement exposure history collected for the consumer.

The product presentation database is coupled to the central web-services database system and stores product presentation data for the products featured in the product presentation and retailer category presentation databases, wherein changes to product presentation data stored in the product presentation database are automatically reflected on one or more online retail storefronts. Product presentation data is stored in the product presentation database by a plurality of the manufacturers or by one or more of the retailers in the case of retailer branded private label products.

The retailer category presentation database is coupled to the central web-services database system and stores product category presentation data for the retailer categories featured in the retailer category presentation database, wherein at least one of the retailer categories featured in the retailer category presentation database includes references to product presentation data stored by a plurality of the manufacturers in the product presentation database, and wherein changes to the product category presentation data stored in the category presentation database are automatically reflected on one or more of the online retail storefronts. Product category presentation data is stored in the retailer category presentation database by the one or more retailers.

At least one retailer creates an online retail storefront using information in the product presentation database and the category presentation database and consumer profiles of consumers visiting the online retail storefront. The individual consumers are provided with access to one or more online retailer storefronts. One or more of the online retail storefronts are served to consumers based on the consumer profiles of the consumers, wherein the consumer profiles used for serving the online retail storefronts were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating advertisement exposure history collected for the consumers.

Independently of the serving of the online retail storefronts, the shopping and online and in-store purchase behavior of consumers with a common consumer profile to whom a benefit card has been provided is monitored with respect to at least one product, manufacturer, retailer category or retailer; and wherein said shopping behavior of the consumers is monitored by parsing the log files indicating information each consumer retrieves on-line corresponding to products featured in the product presentation database and retailer categories featured in the retailer category presentation database coupled to the central web-services database system, and wherein the on-line and in-store purchase behavior of the consumers is monitored by using the benefit cards to capture on-line and in-store sales made to the consumers by a plurality of retailers.

One or more overall effectiveness indicators is calculated for each of the products, manufacturers, retailer categories or retailers based on the monitored shopping and purchase behavior of consumers with a common consumer profile.

In accordance with a second aspect, the present invention is directed to a process for improving communication effectiveness between manufacturers, retailers and individual consumers and making information exchange easier. This second aspect includes the following steps:

Data indicating shopping and purchase behavior history is collected for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected indicating advertisement exposure history for each of the individual consumers by logging advertisements served to the consumer along with ad-sponsored content; and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and sales made by the plurality of retailers of the products featured in the product presentation database and the retailer category presentation database, and data indicating advertisement exposure history collected for the consumer.

The product presentation database is coupled to the central web-services database system and stores product presentation data for the products featured in the product presentation and retailer category presentation databases; wherein changes to product presentation data stored in the product presentation database are automatically reflected on one or more portal-branded registries. Product presentation data is stored in the product presentation database by a plurality of the manufacturers or by one or more of the retailers in the case of retailer branded private label products.

The retailer category presentation database is coupled to the central web-services database system and stores product category presentation data for the retailer categories featured in the retailer category presentation database, wherein at least one of the retailer categories featured in the retailer category presentation database includes references to product presentation data stored by a plurality of the manufacturers in the product presentation database, and wherein changes to the product category presentation data stored in the category presentation database are automatically reflected on one or more of the portal-branded registries. Product category presentation data is stored in the retailer category presentation database by the one or more retailers.

For each of a plurality of portals, a portal-branded registry is created using information in the product presentation database and the category presentation database and consumer profiles of consumers requesting information from the registry, said portal-branded registry selected from the group consisting of a product registry or a retailer special offer registry.

The individual consumers are provided with access to an ad-sponsored shopping service that includes at least one from the group consisting of a portal-branded product registry and a portal-branded retailer special offer registry.

One or more of the portal-branded registries are served to consumers based on the consumer profiles of the consumers, wherein the consumer profiles used for serving the online retail storefronts were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating advertisement exposure history collected for the consumers.

Independently of the serving of the portal-branded registries, the shopping and online and in-store purchase behavior of consumers with a common consumer profile to whom a benefit card has been provided are monitored with respect to at least one product, manufacturer, retailer category or retailer; and wherein said shopping behavior of the consumers is monitored by parsing the log files indicating information each consumer retrieves on-line corresponding to products featured in the product presentation database and retailer categories featured in the retailer category presentation database coupled to the central web-services database system, and wherein the on-line and in-store purchase behavior of the consumers is monitored by using the benefit cards to capture on-line and in-store sales made to the consumers by a plurality of retailers.

One or more overall effectiveness indicators are calculated for each of the products, manufacturers, retailer categories or retailers based on the monitored shopping and purchase behavior of consumers with a common consumer profile.

In accordance with a third aspect, the present invention is directed to a process for making in-store traffic generation of retailers more effective by focusing advertising communication of retailer special offers on a target audience of individual consumers with a common consumer profile, defined by a retailer. This third aspect includes the following steps:

Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data indicating advertisement exposure history is collected for each of the individual consumers by logging advertisements served to the consumer along with ad-sponsored content, and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating advertisement exposure history collected for the consumer.

The product presentation database is coupled to a central web-services database system and stores product presentation data for products featured in the product presentation database. The category presentation database of the central web-services database system stores product category presentation data for the products featured in the product presentation and category presentation databases of the central web-services database system, wherein at least one of the retailer categories featured in the retailer category presentation database includes references to product presentation data stored by a plurality of the manufacturers in the product presentation database.

A plurality of retailer special offer presentations are stored in the category presentation database coupled to the central web-services database system, wherein each of the plurality of retailer special offer presentations stored in the category presentation database is scheduled to be delivered to at least some members of an identified target audience of individual consumers with a common consumer profile while visiting a portal-branded retailer special offer registry of one of a plurality of portals and wherein at least one target audience identified for at least one of the retailer special offer presentations corresponds to individual consumers from a plurality of retailers.

For each of the plurality of portals, a portal-branded registry is created using information in the product presentation database and the category presentation database and consumer profiles of consumers requesting information from the registry, said portal-branded registry providing the individual consumers with access to a product registry or a retailer special offer registry featuring retailer special offers that can be purchased online and picked up in-store.

A product and category presentation server system, coupled to the product presentation and the category presentation database of the central web-services database system, serves a selected retailer special offer presentation referenced in the portal-branded retailer special offer registry of a portal from the category presentation database based on the identified target audience of the selected retailer special offer presentation and the consumer profile of a consumer requesting information from the portal-branded retailer special offer registry; wherein the consumer profiles used for serving the retailer special offer presentation were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating advertisement exposure history collected for the consumers.

An online consumer purchase order is processed for a special offer product that will be picked up in-store, and a retailer cashier system is notified of the pre-paid purchase order.

In accordance with a fourth aspect, the present invention is directed to a process for making in-store traffic generation of retailers more effective by focusing advertising communication of retailer special offers on a target audience of individual consumers with a common consumer profile defined by a retailer. This fourth aspect includes the following steps:

Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected indicating advertisement exposure history for each of the individual consumers by logging advertisements served to the consumer along with ad-sponsored content, and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating advertisement exposure history collected for the consumer.

The product presentation database is coupled to a central web-services database system and stores product presentation data for products featured in the product presentation database. The category presentation database of the central web-services database system stores product category presentation data for the products featured in the product presentation and category presentation databases of the central web-services database system, wherein at least one of the retailer categories featured in the retailer category presentation database includes references to product presentation data stored by a plurality of the manufacturers in the product presentation database.

A plurality of retailer special offer presentations are stored in the category presentation database coupled to the central web-services database system, wherein each of the retailer special offer presentations stored in the retailer category presentation database is scheduled to be delivered to at least some members of an identified target audience of individual consumers with a common consumer profile while visiting an online retail storefront of one of the retailers; and wherein the retailer special offer presentations stored in the retailer category presentation database are intended to promote the retailer categories of a plurality of retailers.

At least one retailer creates an online retail storefront using information in the product presentation database and the retailer category presentation database and consumer profiles of consumers visiting the online retail storefront.

A product and category presentation server system, coupled to the product presentation and the category presentation database of the central web-services database system, serves a retailer special offer presentation from the retailer category presentation database based on the identified target audience of the selected retailer special offer presentation and the consumer profile of a consumer requesting information from an online retail storefront; wherein the consumer profiles used for serving the retailer special offer presentation were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating advertisement exposure history collected for the consumers.

An online consumer purchase order is processed for a special offer product that will be picked up in-store, and a retailer cashier system is notified of the pre-paid purchase order.

In accordance with a fifth aspect, the present invention is directed to a process for managing the presentation of a product category featured in an online storefront of a retailer and for increasing effectiveness thereof. This fifth aspect includes the following steps:

Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

Individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected indicating category presentation exposure history for each of the individual consumers by logging category presentations served to the consumer, and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating category presentation exposure history collected for the consumer.

The product presentation database is coupled to a central web-services database system and stores product presentation data for products featured in the product presentation database and the category presentation database of the central web-services database system; wherein changes to product presentation data stored in the product presentation database are automatically reflected on one or more online retail storefronts. A plurality of the manufacturers, or one or more of the retailers in the case of retailer branded private label products, store product presentation data in the product presentation database.

The retailer category presentation database is coupled to the central web-services database system, and stores product category presentation data for the retailer categories featured in the retailer category presentation database; wherein at least one of the retailer categories featured in the retailer category presentation database includes references to product presentation data stored by a plurality of the manufacturers in the product presentation database; wherein changes to the product category presentation data stored in the category presentation database are automatically reflected on one or more of the online retail storefronts and wherein the category presentation data is scheduled to be delivered to at least some members of a target audience of individual consumers with a common consumer profile.

One or more retailers store product category presentation data in the retailer category presentation database; wherein each of the category presentations stored in the retailer category presentation database is scheduled to be delivered to a first portion of a target audience of individual consumers with a common consumer profile while visiting an online retail storefront of one of the retailers and wherein a control group of consumers belonging to the second portion of the target audience of the corresponding category presentation is scheduled to be exposed to a non-targeted reference category presentation wherein the non-targeted reference category presentation is different from the selected category presentation.

At least one retailer creates an online retail storefront using information in the product presentation database and the category presentation database and consumer profiles of consumers visiting the online retail storefront, said online retail storefront being provided to the individual consumers.

A product and category presentation server system, coupled to the product presentation and the category presentation database of the central web-services database system, serves a category presentation from the category presentation database based on the consumer profile of a consumer requesting information from the online retail storefront.

A product and category presentation server system, coupled to the product presentation and the category presentation database of the central web-services database system, serves a plurality of product presentations referenced in the category presentation from the product presentation database based on the consumer profile of a consumer requesting information from the online retail storefront.

The selected category presentation is served to consumers belonging to the first portion of the target audience and the non-targeted reference category presentation of the selected category presentation is served to consumers belonging to the second portion of the target audience, wherein the target audience is identified by selecting individual consumers having consumer profiles that match the target audience definition of the selected category presentation, wherein the consumer profiles used for identifying the individual consumers in the target audience were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating category presentation exposure history collected for the consumers.

The shopping and purchase behavior of consumers from a first portion of the target audience that have been exposed to the selected category presentation, and the shopping and purchase behavior of consumers from a second portion of the target audience that have been exposed to the non-targeted reference category presentation, are monitored with respect to the products and retailer associated with the selected category presentation.

One or more effectiveness indicators of the selected category presentation is calculated based on at least the monitored shopping and purchase behavior of the consumers from the first portion of the target audience that have been exposed to the selected category presentation with respect to the products and retailer associated with the selected category presentation, and the shopping and purchase behavior of consumers from the second portion of the target audience that have been exposed to the non-targeted reference category presentation.

The one or more effectiveness indicators of the selected category presentation are provided to the retailer in order to assist in a decision by the retailer to invest in the selected category presentation or to withdraw the selected category presentation.

In accordance with a sixth aspect, the present invention is directed to a process for managing presentation of a product featured in one or more online storefronts of one or more retailers and for increasing effectiveness thereof. This sixth aspect includes the following steps:

Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected indicating advertisement exposure history for each of the individual consumers by logging advertisements served to the consumer along with ad-sponsored content.

Data is collected indicating product presentation exposure history for each of the individual consumers by logging product presentations served to the consumer, and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating product presentation exposure history collected for the consumer.

The product presentation database is coupled to a central web-services database system and stores product presentation data for products featured in the product presentation database and the category presentation database of the central web-services database system; wherein changes to product presentation data stored in the product presentation database are automatically reflected on one or more online retail storefronts and wherein the product presentation data is scheduled to be delivered to at least some members of a target audience of individual consumers with a common consumer profile.

A plurality of the manufacturers, or by one or more of the retailers in the case of retailer branded private label products, store product presentation data in the product presentation database; wherein each of the product presentations stored in the product presentation database is scheduled to be delivered to a first portion of a target audience of individual consumers with a common consumer profile while visiting an online retail storefront of one of the retailers and wherein a control group of consumers belonging to the second portion of the target audience of the corresponding product presentation is scheduled to be exposed to a non-targeted reference product presentation wherein the non-targeted reference product presentation is different from the selected product presentation.

The retailer category presentation database, coupled to the central web-services database system, stores product category presentation data for the retailer categories featured in the retailer category presentation database; wherein at least one of the retailer categories featured in the retailer category presentation database includes references to product presentation data stored by a plurality of the manufacturers in the product presentation database; wherein changes to the product category presentation data stored in the category presentation database are automatically reflected on one or more of the online retail storefronts.

One or more retailers store product category presentation data in the retailer category presentation database, and at least one retailer creates an online retail storefront using information in the product presentation database and the category presentation database and consumer profiles of consumers visiting the online retail storefront, said online retail storefront being provided to the individual consumers.

A product and category presentation server system, coupled to the product presentation and the category presentation database of the central web-services database system, serves a product presentation of a product referenced in the category presentation of an online retail storefront from the product presentation database based on the consumer profile of a consumer requesting information from the online retail storefront.

The selected product presentation is served in a retailer-specific presentation format along side other online retail storefront information to consumers belonging to the first portion of the target audience and the non-targeted reference product presentation of the selected product presentation is served to consumers belonging to the second portion of the target audience, wherein the target audience is identified by selecting individual consumers having consumer profiles that match the target audience definition of the selected product presentation, wherein the consumer profiles used for identifying the individual consumers in the target audience were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating product presentation exposure history collected for the consumers.

The shopping and purchase behavior of consumers from the first portion of the target audience that have been exposed to the selected product presentation, and the shopping and purchase behavior of consumers from the second portion of the target audience that have been exposed to the non-targeted reference product presentation, are monitored with respect to at least one product or retailer associated with the selected product presentation.

One or more effectiveness indicators of the selected product presentation are calculated based on at least the monitored shopping and purchase behavior of the consumers from a first portion of the target audience that have been exposed to the selected product presentation with respect to the at least one product or retailer associated with the selected product presentation and the shopping and purchase behavior of consumers from a second portion of the target audience that have been exposed to the non-targeted reference product presentation.

The one or more effectiveness indicators of the selected product presentation are provided to (i) one of the manufacturers in order to assist in a decision by the manufacturer to invest in the selected product presentation or to withdraw the selected product presentation, or (ii) one of the retailers, in the case of retailer branded private label products, in order to assist in a decision by the retailer to invest in the selected product presentation or to withdraw the selected product presentation.

In accordance with a seventh aspect, the present invention is directed to a process for managing product category promotions featured in an online storefront of a retailer and for increasing effectiveness thereof. This seventh aspect includes the following steps:

Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected indicating product category promotion exposure history for each of the individual consumers by logging product category promotions served to the consumer; and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating product category promotion exposure history collected for the consumer.

The product presentation database is coupled to a central web-services database system and stores product presentation data for products featured in the product presentation database and a category presentation database of the central web-services database system; wherein changes to product presentation data stored in the product presentation database are automatically reflected on one or more online retail storefronts. A plurality of the manufacturers, or one or more of the retailers in the case of retailer branded private label products, store product presentation data in the product presentation database.

The retailer category presentation database is coupled to the central web-services database system and stores product category presentation data for the retailer categories featured in the retailer category presentation database; wherein at least one of the retailer categories featured in the retailer category presentation database includes references to product presentation data stored by a plurality of the manufacturers in the product presentation database; wherein changes to the product category presentation data stored in the category presentation database are automatically reflected on one or more of the online retail storefronts and wherein the category presentation data is scheduled to be delivered to at least some members of a target audience of individual consumers with a common consumer profile.

A plurality of product category promotions are stored in the category presentation database coupled to the central web-services database system, wherein each of the plurality of product category promotions stored in the category presentation database originates from at least one of the retailers, and is scheduled to be delivered to at least some members of the target audience of individual consumers with the common consumer profile while visiting one of the online retail storefronts.

At least one retailer creates an online retail storefront using information in the product presentation database and the category presentation database and consumer profiles of consumers visiting the online retail storefront, said online retail storefront being provided to the individual consumers.

A product and category presentation server system, coupled to the product presentation and the category presentation database of the central web-services database system, selects a product category promotion referenced in the category presentation of an online retail storefront from the category presentation database based on the consumer profile of a consumer requesting information from the online retail storefront. The selected product category promotion is served to consumers belonging to the first portion of the target audience; wherein the target audience is identified by selecting individual consumers having consumer profiles that match the target audience definition of the selected product category promotion; wherein the consumer profiles used for identifying the individual consumers in the target audience were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating product category promotion exposure history collected for the consumers.

The shopping and purchase behavior of consumers from a first portion of the target audience that have been exposed to the selected product category promotion, and the shopping and purchase behavior of consumers from a second portion of the target audience that have not been exposed to the selected product category promotion, are monitored with respect to the products and retailer associated with the selected product category promotion.

One or more effectiveness indicators of the selected product category promotion are calculated based on at least the monitored shopping and purchase behavior of the consumers from the first portion of the target audience that have been exposed to the selected product category promotion with respect to the products and retailer associated with the selected product category promotion, and the shopping and purchase behavior of consumers from the second portion of the target audience that have not been exposed to the selected product category promotion.

The one or more effectiveness indicators of the selected product category promotion are provided to the retailer in order to assist in a decision by the retailer to invest in the selected product category promotion or to withdraw the selected product category promotion.

In accordance with an eighth aspect, the present invention is directed to a process for managing product promotions featured in an online storefront of at least one retailer and for increasing effectiveness thereof. This eighth aspect includes the following steps:

Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected indicating product promotion exposure history for each of the individual consumers by logging product promotions served to the consumer, and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating product promotion exposure history collected for the consumer.

The product presentation database is coupled to a central web-services database system and stores product presentation data for products featured in the product presentation database and the category presentation database of the central web-services database system; wherein changes to product presentation data stored in the product presentation database are automatically reflected on one or more online retail storefronts and wherein the product presentation data is scheduled to be delivered to at least some members of a target audience of individual consumers with a common consumer profile.

A plurality of product promotions are stored in the product presentation database coupled to the central web-services database system, wherein each of the plurality of product promotions stored in the product presentation database originates from at least one of the retailers or manufacturers, and is scheduled to be delivered to at least some members of the target audience of individual consumers with the common consumer profile while visiting an online retail storefront of at least one of the retailers.

The retailer category presentation database, coupled to the central web-services database system, stores product category presentation data for one or more of the retailers of the products featured in the product presentation and category presentation databases of the central web-services database system; wherein at least one of the retailer categories featured in the retailer category presentation database includes references to product presentation data stored by a plurality of the manufacturers in the product presentation database; wherein changes to the product category presentation data stored in the category presentation database are automatically reflected on one or more online retail storefronts.

At least one retailer creates an online retail storefront using information in the product presentation database and the category presentation database and consumer profiles of consumers visiting the online retail storefront, said online retail storefront featuring one or more product promotions and being provided to the individual consumers.

A product and category presentation server system, coupled to the product presentation and the category presentation database of the central web-services database system, selects a product promotion of a product referenced in the category presentation of an online retail storefront from the product presentation database based on the consumer profile of a consumer requesting information from the online retail storefront. The selected product promotion is served to consumers belonging to the first portion of the target audience along side other online retail storefront information; wherein the target audience is identified by selecting individual consumers having consumer profiles that match the target audience definition of the selected product promotion, wherein the consumer profiles used for identifying the individual consumers in the target audience were generated from the collected data indicating shopping behavior history with respect to the products featured in the product presentation database and with respect to the retailer categories featured in the retailer category presentation database, the collected data indicating purchase behavior history captured using the benefit cards of online and in-store sales made by the plurality of retailers of the products featured in the product presentation database and the retailer category presentation database, and data indicating product promotion exposure history collected for the consumers.

The shopping and purchase behavior of consumers from a first portion of the target audience that have been exposed to the selected product promotion, and the shopping and purchase behavior of consumers from a second portion of the target audience that have not been exposed to the selected product promotion, are monitored with respect to at least one product or retailer associated with the selected product promotion.

One or more effectiveness indicators of the selected product promotion are calculated based on at least the monitored shopping and purchase behavior of the consumers from the first portion of the target audience that have been exposed to the selected product promotion with respect to at least one product or retailer associated with the selected product promotion, and the shopping and purchase behavior of consumers from the second portion of the target audience that have not been exposed to the selected product promotion.

The one or more effectiveness indicators of the selected product promotion are provided (i) to a manufacturer in order to assist in a decision by the manufacturer to invest in the selected product promotion or to withdraw the selected product promotion, or (ii) to a retailer, in the case of retailer branded private label products, in order to assist in a decision by the retailer to invest in the selected product promotion or to withdraw the selected product promotion.

In accordance with a ninth aspect, the present invention is directed to a process for managing retailer product category promotions featured in a portal branded special offer registry and increasing effectiveness thereof. This ninth aspect includes the following steps:

- Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.
- The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.
- Data is collected indicating product category promotion exposure history for each of the individual consumers by logging product category promotions served to the consumer;
- generating a consumer profile for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating retailer product category promotion exposure history collected for the consumer.
- The product presentation database, coupled to a central web-services database system, stores product presentation data for products featured in the product presentation database and the category presentation database of the central web-services database system. The retailer category presentation database, coupled to the central web-services database system, stores product category presentation data for the retailer categories featured in the retailer category presentation database; wherein at least one of the retailer categories featured in the retailer category presentation database includes references to product presentation data stored by a plurality of the manufacturers in the product presentation database; wherein changes to the product category presentation data stored in the retailer category presentation database are automatically reflected on one or more portal-branded registries and wherein the category presentation data is scheduled to be delivered to at least some members of a target audience of individual consumers with a common consumer profile.
- A plurality of retailer product category promotions are stored in the category presentation database coupled to the central web-services database system, wherein each of the plurality of category promotions stored in the category presentation database originates from at least one of the retailers, and is scheduled to be delivered to at least some members of the target audience of individual consumers with the common consumer profile while visiting the portal branded retailer special offer registry associated with one of a plurality of portals.
- For each of the plurality of portals, a portal-branded registry is created using information in the product presentation database and the category presentation database and consumer profiles of consumers requesting the registry, said portal-branded registry selected from the group consisting of a product registry or a retailer special offer registry.
- The individual consumers are provided with access to an ad-sponsored shopping service that includes at least one from the group consisting of a portal-branded product registry, a portal-branded retailer special offer registry featuring specials that can be purchased online and picked up in-store, and an online storefront registry.
- A product and category presentation server system, coupled to the product presentation and the category presentation database of the central web-services database system, selects a retailer product category promotion referenced in the portal-branded retailer special offer registry of a portal from the category presentation database based on the consumer profile of a consumer requesting category information from the portal-branded retailer special offer registry. The selected retailer product category promotion is served to consumers belonging to a first portion of the target audience in a portal-specific presentation format along side other portal-branded retailer special offer registry information; wherein the target audience is identified by selecting individual consumers having consumer profiles that match the target audience definition of the selected retailer product category promotions, wherein the consumer profiles used for identifying the individual consumers in the target audience were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating retailer product category promotion exposure history collected for the consumers.
- The shopping and purchase behavior of consumers from the first portion of the target audience that have been exposed to the selected retailer product category promotion, and the shopping and purchase behavior of consumers from a second portion of the target audience that have not been exposed to the selected retailer product category promotion, are monitored with respect to the products and retailer associated with the selected retailer product category promotion.

One or more effectiveness indicators of the selected retailer product category promotion is calculated based on at least the monitored shopping and purchase behavior of the consumers from the first portion of the target audience that have been exposed to the selected retailer product category promotion with respect to the products and retailer associated with the selected retailer product category promotion, and the shopping and purchase behavior of consumers from the second portion of the target audience that have not been exposed to the selected retailer product category promotion.

The one or more effectiveness indicators of the selected retailer product category promotion are provided to the retailer in order to assist in a decision by the retailer to invest in the selected retailer product category promotion or to withdraw the selected retailer product category promotion.

In accordance with a tenth aspect, the present invention is directed to a process for managing presentation of a product featured in a portal branded product registry of at least one of a plurality of portals and for increasing effectiveness thereof. This tenth aspect includes the following steps:

Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected indicating product presentation exposure history for each of the individual consumers by logging product presentations served to the consumer, and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating product presentation exposure history collected for the consumer.

The product presentation database, coupled to a central web-services database system, stores product presentation data for products featured in the product presentation database and the category presentation database of the central web-services database system; wherein changes to product presentation data stored in the product presentation database are automatically reflected on one or more portal-branded registries and wherein the product presentation data is scheduled to be delivered to at least some members of a target audience of individual consumers with a common consumer profile visiting the portal branded product registry associated with one of the plurality of portals;

A plurality of the manufacturers, or one or more of the retailers in the case of retailer branded private label products, store product presentation data in the product presentation database; wherein each of the product presentations stored in the product presentation database is scheduled to be delivered to a first portion of a target audience of individual consumers with a common consumer profile while visiting a portal-branded product registry of one of a plurality of portals and wherein a control group of consumers belonging to the second portion of the target audience of the corresponding product presentation is scheduled to be exposed to a non-targeted reference product presentation wherein the non-targeted reference product presentation is different from the selected product presentation.

The retailer category presentation database, coupled to the central web-services database system, stores product category presentation data for the retailer categories featured in the retailer category presentation database; wherein at least one of the retailer categories featured in the retailer category presentation database includes references to product presentation data stored by a plurality of the manufacturers in the product presentation database; wherein changes to the product category presentation data stored in the retailer category presentation database are automatically reflected on one or more portal-branded registries and wherein the category presentation data is scheduled to be delivered to at least some members of a target audience of individual consumers with a common consumer profile.

For each of the plurality of portals, a portal-branded registry is created using information in the product presentation database and the category presentation database and consumer profiles of consumers requesting the registry, said portal-branded registry selected from the group consisting of a product registry or a retailer special offer registry.

The individual consumers are provided with access to an ad-sponsored shopping service that includes at least one from the group consisting of a portal-branded product registry, a portal-branded retailer special offer registry featuring specials that can be purchased online and picked up in-store, and an online storefront registry.

A product and category presentation server system, coupled to the product presentation and the category presentation database of the central web-services database system, selects a product presentation of a product referenced in the portal-branded product registry of one of the plurality of portals from the product presentation database based on the consumer profile of a consumer requesting product information from the portal-branded product registry. The selected product presentation is served in a portal-specific presentation format alongside other portal-branded product registry information to consumers belonging to the first portion of the target audience and the non-targeted reference product presentation of the selected product presentation is served to consumers belonging to the second portion of the target audience; wherein the target audience is identified by selecting individual consumers having consumer profiles that match the target audience definition of the selected product presentation, wherein the consumer profiles used for identifying the individual consumers in the target audience were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating product presentation exposure history collected for the consumers.

The shopping and purchase behavior of consumers from the first portion of the target audience that have been exposed to the selected product presentation, and the shopping and purchase behavior of consumers from the second portion of the target audience that have been exposed to the non-targeted reference product presentation, are monitored with respect to at least one product or retailer associated with the selected product presentation.

One or more effectiveness indicators of the selected product presentation are calculated based on at least the monitored shopping and purchase behavior of the consumers from the first portion of the target audience that have been exposed to the selected product presentation with respect to the at least one product or retailer associated with the selected product presentation, and the shopping and purchase behavior of consumers from the second portion of the target audience that have been exposed to the non-targeted reference product presentation.

The one or more effectiveness indicators of the selected product presentation are provided (i) to a manufacturer in order to assist in a decision by the manufacturer to invest in the selected product presentation or to withdraw the selected product presentation, or (ii) to a retailer, in the case of retailer branded private label products, in order to assist in a decision by the retailer to invest in the selected product presentation or to withdraw the selected product presentation.

In accordance with an eleventh aspect, the present invention is directed to a process for managing retailer special offer presentations featured in an online storefront of a retailer and increasing effectiveness thereof. This eleventh aspect includes the following steps:

Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected data indicating retailer special offer presentation exposure history for each of the individual consumers by logging retailer special offer presentations served to the consumer, and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating retailer special offer presentation exposure history collected for the consumer.

The product presentation database, coupled to a central web-services database system, stores product presentation data for products featured in the product presentation database and the category presentation database of the central web-services database system; wherein changes to product presentation data stored in the product presentation database are automatically reflected on one or more online retail storefronts; and wherein the product presentation data is scheduled to be delivered to at least some members of a target audience of individual consumers with a common consumer profile.

The retailer category presentation database, coupled to the central web-services database system, stores product category presentation data for the retailer categories featured in the retailer category presentation database; wherein at least one of the retailer categories featured in the retailer category presentation database includes references to product presentation data stored by a plurality of the manufacturers in the product presentation database; wherein changes to the product category presentation data stored in the retailer category presentation database are automatically reflected on one or more online retail storefronts; and wherein the category presentation data is scheduled to be delivered to at least some members of a target audience of individual consumers with a common consumer profile.

A plurality of retailer special offer presentations are stored in the category presentation database coupled to the central web-services database system, wherein each of the plurality of retailer special offer presentations stored in the category presentation database is scheduled to be delivered to at least some members of an identified target audience of individual consumers with a common consumer profile while visiting an online retail storefront of one of the retailers.

At least one retailer creates an online retail storefront using information in the product presentation database and the category presentation database and consumer profiles of consumers visiting the online retail storefront, said online retail storefront being provided to the individual consumers.

A product and category presentation server system, coupled to the product presentation and the category presentation database of the central web-services database system, selects a retailer special offer presentation referenced in an online storefront of a retailer from the category presentation database based on the consumer profile of a consumer requesting category information from the online storefront of a retailer. The selected retailer special offer presentation is served to consumers belonging to a first portion of the target audience; wherein the target audience is identified by selecting individual consumers having consumer profiles that match the target audience of the selected special offer presentation, wherein the consumer profiles used for identifying the individual consumers in the target audience were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating retailer special offer presentation exposure history collected for the consumers.

The shopping and purchase behavior of consumers from the first portion of the target audience that have been exposed to the selected retailer special offer presentation, and the shopping and purchase behavior of consumers from a second portion of the target audience that have not been exposed to the selected retailer special offer presentation, are monitored with respect to the products and retailer associated with the selected retailer special offer presentation.

One or more effectiveness indicators of the selected retailer special offer presentation are calculated based on at least the monitored shopping and purchase behavior of the consumers from the first portion of the target audience that have been exposed to the selected retailer special offer presentation with respect to the products and retailer associated with the selected retailer special offer presentation, and the shopping and purchase behavior of consumers from the second portion of the target audience that have not been exposed to the selected retailer special offer presentation.

The one or more effectiveness indicators of the selected retailer special offer presentation are provided to the retailer in order to assist in a decision by the retailer to invest in the selected retailer special offer presentation or to withdraw the selected retailer special offer presentation.

In accordance with a twelfth aspect, the present invention is directed to a process for managing retailer special offer presentations featured in a portal branded product registry and increasing effectiveness thereof. This twelfth aspect includes the following steps:

Data is collected indicating shopping and purchase behavior history for a plurality of individual consumers, wherein said collecting of data indicating shopping behavior history is performed by parsing log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers.

The individual consumers are provided with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer.

Data is collected indicating retailer special offer presentation exposure history for each of the individual consumers by logging retailer special offer presentations served to the consumer, and a consumer profile is generated for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating retailer special offer presentation exposure history collected for the consumer.

The product presentation database, coupled to a central web-services database system, stores product presentation data for products featured in the product presentation database and a category presentation database of the central web-services database system; wherein changes to product presentation data stored in the product presentation database are automatically reflected on one or more portal-branded registries and wherein the product presentation data is scheduled to be delivered to at least some members of a target audience of individual consumers with a common consumer profile visiting the portal branded product registry associated with one of the plurality of portals.

The retailer category presentation database, coupled to the central web-services database system, stores product category presentation data for the retailer categories featured in the retailer category presentation database; wherein at least one of the retailer categories featured in the retailer category presentation database includes references to product presentation data stored by a plurality of the manufacturers in the product presentation database; wherein changes to the product category presentation data stored in the retailer category presentation database are automatically reflected on one or more portal-branded registries; and wherein the category presentation data is scheduled to be delivered to at least some members of a target audience of individual consumers with a common consumer profile.

A plurality of retailer special offer presentations are stored in the category presentation database coupled to the central web-services database system, wherein each of the plurality of retailer special offer presentations stored in the category presentation database is scheduled to be delivered to at least some members of an identified target audience of individual consumers with a common consumer profile while visiting a portal branded retailer special offer registry associated with one of a plurality of portals.

For each of the plurality of portals, a portal-branded registry is created using information in the product presentation database and the category presentation database and consumer profiles of consumers requesting the registry, said portal-branded registry selected from the group consisting of a product registry or a retailer special offer registry.

The individual consumers are provided with access to an ad-sponsored shopping service that includes at least one from the group consisting of a portal-branded product registry, a portal-branded retailer special offer registry featuring specials that can be purchased online and picked up in-store, and an online storefront registry.

A product and category presentation server system, coupled to the product presentation and the category presentation database of the central web-services database system, selects a retailer special offer presentation referenced in the portal-branded retailer special offer registry of a portal from the category presentation database based on the consumer profile of a consumer requesting category information from the portal-branded retailer special offer registry. The selected retailer special offer presentation is served to consumers belonging to a first portion of the target audience in a portal-specific presentation format along side other portal-branded retailer special offer registry information; wherein the target audience is identified by selecting individual consumers having consumer profiles that match the target audience definition of the selected retailer special offer presentation wherein the consumer profiles used for identifying the individual consumers in the target audience were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating retailer special offer presentation exposure history collected for the consumers.

The shopping and purchase behavior of consumers from the first portion of the target audience that have been exposed to the selected retailer special offer presentation, and the shopping and purchase behavior of consumers from a second portion of the target audience that have not been exposed to the selected retailer special offer presentation, are monitored with respect to the products and retailer associated with the selected retailer special offer presentation.

One or more effectiveness indicators of the selected retailer special offer presentation is calculated based on at least the monitored shopping and purchase behavior of the consumers from the first portion of the target audience that have been exposed to the selected retailer special offer presentation with respect to the products and retailer associated with the selected retailer special offer presentation, and the shopping and purchase behavior of consumers from the second portion of the target audience that have not been exposed to the selected retailer special offer presentation.

The one or more effectiveness indicators of the selected retailer special offer presentation are provided to the retailer in order to assist in a decision by the retailer to invest in the selected retailer special offer presentation or to withdraw the selected retailer special offer presentation.

BRIEF DESCRIPTION OF THE DRAWINGS

FIG. 1 illustrates the central web services system of the present invention.

FIG. 2 illustrates the interaction between manufacturers and the central system.

FIGS. 3(a)-3(b) illustrate the retailer's interaction with the central system.

FIG. 4 shows the portal configuration of the central system.

FIG. 5 illustrates the consumer marketing of the portals personal interactive shopping and info/news/entertainment services.

FIGS. 6(a)-(c) illustrate various the subscription management process interaction between a consumer, a portal and the central system.

FIGS. 7(a)-(e) illustrate the consumer shopping processes of the central web services system FIGS. 8(a)-(d) illustrate processing purchase orders that are delivered home to the consumer FIG. 9 illustrates the processing of in-store purchases using the loyalty/benefit card FIG. 10(a)-(e) illustrate processing purchase orders that are picked-up in-store by the consumer FIG. 11(a)-(c) illustrate the systems functionality to serve advertisements on the interactive personal info, news and entertainment services of consumers.

FIG. 12(a)-(c) illustrate the systems consumer 'target audience categorization and effectiveness evaluation run' as well as the consumer attitude collection and processing and the feedback information reporting to advertisers and retailers.

FIG. 13 is a Table illustrating how an advertiser can filter out ineffective ads.

FIG. 14 is a Table illustrating ROI impact of customization of advertising messages.

DETAILED DESCRIPTION OF THE INVENTION

The present invention provides consumers, manufacturers, retailers and interactive media/telecom companies with interactive marketing communication/IT infrastructure services, and market intelligence, permitting the creation of personal consumer-customized shopping information and personalized purchase-behavior specific or context-sensitive advertising (see appendix I), resulting in effective, personalized interactive consumer communication and advertising campaigns, effective and cost efficient interactive retailer categories and electronic storefronts, and profitable, convenient interactive shopping and media services.

The present system relates to a web services system for consumer marketing communication, and shopping processes between consumers, manufacturers, retailers and media companies. The system provides tools for the integrated interaction of manufacturers, retailers, media companies and consumers, creating powerful efficiencies and network effects that streamline personalized interactive communication and transaction processes between consumers and retailers/manufacturers, while creating sustainable advertising revenue for media and telecom companies that enable them to offer free ad-based interactive entertainment and convenient shopping services to consumers.

The present invention includes, but is not limited to, the following system modules:

The Personal Customization and Privacy Control Module

This aspect of the invention personalizes the user's/consumer shopping, media, and advertising experience by means of a tool that captures individual consumer needs while providing privacy protection. The personal customization and privacy control module performs the following functions:

Tracking personal shopping behavior/preferences and ad exposure with consumer consent.

Making the interactive user experience more convenient and relevant for consumers.

Provides the consumer user with access to a personal portal branded shopping services.

Providing portal branded personalized ad, news, and entertainment services.

Protecting user privacy by providing consumers with direct control over their personal profile data.

Provides the consumer user with a benefit card, giving them access to special benefits and promotions, such as earning 'bonus points' on all their online and offline purchases at retailing members, and preferential access to special promotions of leading retailers and manufacturers.

Product Information & Ad Control Module

This aspect of the invention provides indirect sellers, such as manufacturers, with a tool for managing interactive consumer communications, allowing for the distribution of interactive product information and, also, for measuring its effectiveness. The product information and ad control module provides:

Portal/retailer independent direct control and customization of product information.

Customization of Product Information to the shopping needs of special target audiences.

Portal/retailer independent product information effectiveness measurement.

A tool for delivering interactive personalized advertising and measuring its effectiveness.

Access to consumer profiles, to identify consumers shopping/purchase habits and needs.

Ad targeting and delivery to narrow audiences, defined by consumer shopping behavior and needs.

Serving advertisements ("Ads") while consumers are shopping or browsing news, entertainment, etc.

A tool for measuring consumer feedback/purchases to assess advertising effectiveness.

Category Information & Ad Control' Module

This aspect of the invention permits direct sellers of goods or services, such as retailers, to manage interactive storefronts, categories and consumer communication. Features provided by the category information and ad control module include:

Providing an infrastructure for managing fully interactive retailer storefronts, categories and consumer communication and payment, that may be integrated with retailer back-offices systems.

Managing and customizing online retailer product categories.

Communicating and presenting retailer categories and advertisements to consumers.

Directing online consumer traffic to offline stores, retail establishments, etc.

Promoting online sales through offering consumers home delivery from a central warehouse, and dispatching from a central warehouse to a conveniently located store for pick-up by a purchaser.

Measuring and benchmarking the effectiveness of online category presentation and advertising.

Product/Retail Category Information/Ad Server Module

This aspect of the invention provides interactive portal operators with infrastructure for providing consumers with a differentiated portal specific interactive shopping services experience and advertisers with a portal independent ad planning, delivery and effectiveness measurement instrument. The product/retail category information/ad server module includes means for:

Providing the infrastructure that portals need to offer consumers a differentiated portal specific personal shopping experience and advertisers a portal independent ad planning, delivery and effectiveness measurement instrument.

Providing portal branded personal shopping service for consumers.

Providing personal shopping service with a portal-specific user experience.

Portal independent ad planning, delivery and effectiveness measurement, to generate ad revenue for deploying interactive services, e.g., portal-specific personal consumer shopping services and ad-sponsored interactive information and entertainment. In one embodiment of the invention, ad revenue is linked to the number of product/category presentations downloaded by consumers and the # of ads served with interactive shopping and info, news and entertainment services of each portal.

Market Intelligence

Besides information about manufacturer and retailer offers and sales promotions, the invention provides means for creating market intelligence from ad, product, and category database log files:

Portal/Retailer Independent Consumer Shopping/Purchase Habits and Preference Intelligence The system creates centrally stored portal/retail independent consumer shopping/purchase needs and preference information. Consumer profile data may, for example, characterize consumers as:

Heavy—Medium—Light Spenders
Necessity driven buyers vs. Joy/pleasure seeking shoppers
Frequent vs. occasional Shoppers
Prospects, buyers, etc., based on their propensity to effect a transaction.
Users—Non Users
Loyals—Switchers—Occasionals
Strongly Aware—Not Aware Shoppers
Highly Interested—Not interested Shoppers
Premium Quality vs. Basic Quality Shoppers
Wide vs. Narrow Brand Scope Shoppers
Wide vs. Narrow Retailer Scope Shoppers
Promotion vs. No-Promotion Shoppers
Bulk vs. Small Quantity Shoppers
Early Adopters vs. Laggards The above characterization may be done on a category, product brand and retailer basis.

The consumer profile is the result of measuring the value of the shopping habits and need parameters for each consumer retailer/portal independent and then benchmarking these consumers against each other and categorizing them into groups with similar shopping habits/needs. The system allows to identify and target consumers based on their overall shopping habits and purchase needs. In this manner, the present invention is able to create a holistic, 360-degree perspective of the consumer's shopping and purchase habits, to aid in directing the most effective advertising, product and category presentations, and other consumer-specific services.

The system's market intelligence gathering and reporting features allow advertisers to customize on-line communication/ads and to more effectively target advertising, thereby increasing communication effectiveness and improving the financial return on their advertising investment, due to the increased likelihood of a consumer receiving advertisements that they find interesting, timely, or commensurate with their previous purchasing patterns.

Standard Overall Product Brand/Retailer Category Effectiveness Market Intelligence The system provides advertisers with standard effectiveness information on product brands/retailer categories that allows benchmarking of their performance against each other on the following market indicators:

Share
Penetration
Frequency
Loyalty
(Re)Purchase/Churn
Interest
Buyer/Shopper Profile
Communication Effectiveness
Advertising Impact and Exposure
Product Brand Distribution
Retailer Category Assortment
Pricing
Display Productivity
Promotion Impact and Exposure The effectiveness measurement is the result of registering the product/category retrieval, ad exposure and purchase history of each consumer, and processing this data into standard performance indicators, that allow performance benchmarking that is retailer/portal independent:

Product Brand Performance is benchmarked vs. competitive brands.
Retailer Performance is benchmarked vs. the average 'retailing format' peer performance. (i.e. hypermarkets, department stores, catalog, supermarkets, drug stores, electronics, clothing, sports, toys, Book/CD/Video, DIY, Furniture, Office).

The system's 'Market Intelligence' empowers manufacturers and retailers to continuously improve the market effectiveness of their on-line products and categories by measuring key performance indicators and benchmarking their 'offers' against each other.

Standard Product/Category Presentation/Ad/Promotion Effectiveness Market Intelligence The system provides advertisers with standard consumer feedback information about the effect of brand/retailer category presentations, ads and promotions, on brand/retailer purchases and on the brand/retailer market performance indicators listed below:

Share
Consumer Purchases/Sales
Penetration
Frequency
Loyalty
(Re)Purchase/Churn
Interest
Buyer/Shopper Profile
Communication Effectiveness The effectiveness measurement is the result of registering the product/category retrieval, ad exposure and purchase history of each consumer and processing this data into standard impact indicators that allow for performance benchmarking that is retailer and portal independent. In one embodiment of the invention, the effectiveness of each brand/retailer category presentation is determined by measuring the impact of each presentation among those who have been exposed to it, measuring the impact of a presentation reference among a sample of (for example 100) reference consumers of the same audience, calculating the impact delta versus the reference (Score Pres.X/Score Pres.Ref*100), and comparing the impact delta of the presentation vs. that of reference presentation.

Further, the effectiveness of each brand/retailer ad/promotion may, for example, be determined by measuring the impact of each ad/promo among those who have been exposed to it, measuring the impact of no ad/promo among a sample of (for example 100) reference consumers of the same audience, calculating the impact delta versus the Reference (Score Ad/Promo.X/Score.Ref.0*100), and comparing the impact delta of the ad/promo vs. that of other/reference ads/promo's.

The overall effectiveness of a presentation, advertisement or promotion is determined by calculating the average (avg.) and standard deviation (s) of the impact delta (d) of all presentations, advertisements and promotions and categorizing them into an impact delta (d) distribution range:

| (>75% range) | (50%-75% range) | (25%-50% range) | (<25% range) |
|---|---|---|---|
| Strong (d > avg. + 25% * s) | Above Average (avg. < d > avg. + 25% * s) | Below Average (avg. − 25% * s < d > avg.) | Weak (d < avg. − 25% * s) |

The system's market intelligence enables advertisers to measure and benchmark the effectiveness of individual on-line communication/ad/promotion campaigns on consumer purchase behavior thereby making it possible to continuously increase their effectiveness and to focus investments behind the campaigns that generate the highest yield.

Specific definitions of consumer profiles, target audiences, performance indicators and algorithms are attached in Appendix II. By way of example, these definitions and algorithms demonstrate the type of market intelligence information that the system generates, as well as the manner in which it may be generated.

The heart of the operation of the present central manufacturer/retailer/portal independent system, is a central database system for product presentations, category presentations, advertisements and consumer profiles as well as central processing functionality that transforms on-line consumer shopping and purchase data, as well as offline purchase data, into: i) consumer profiles used for targeting and personalizing advertising information and customizing product and category presentations to the needs of individual consumers; ii) performance indicators used to measure the overall on-line market impact of product and category offers, allowing advertisers, manufacturers, or retailers to benchmark market performance, and iii) performance indicators that measure the effect of category and product presentations, ads and promotions on consumer sales and that allow to benchmark their effectiveness against each other.

The input data for the above transformation process that creates the earlier described market intelligence may include: i) the ad, brand presentation, or retailer category presentation database log files of the system; ii) the purchase log files from the system's order processor; and iii) purchase log files from the cashier system(s) of a retailer(s).

The present invention is generally carried out, based on the above described transformation process, on a central platform with 'standardized' manufacturer, retailer and portal independent definitions of consumer profiles, target audiences and performance indicators as well as standardized automated processes for measuring the effect of individual on-line marketing initiatives on consumer purchase behavior and for benchmarking them against each other.

The positive impact of effectiveness measurement on advertising ROI is illustrated in example 1.

The central platform system, as shown in FIG. 1, includes individual databases that store product presentation information, ad messages, category presentations, and consumer profiles. Further, the central database system includes means for processing data, i.e., software applications. Among the software applications present on the central database system will be an ad server, an ad rate calculator, a product and category content server, a consumer profiler, an order processor, and an effectiveness assessor. The present system is applicable to the consumer receiving and displaying the data using a conventional web-browser via an internet connected PC or any type of electronic device (mobile phone, Mira displays, cable TV set-up box) connected to any type of mobile, distributed or local network using any type of transmission protocol.

The Ad Server

The aspect of the invention is included to deliver ads to target audiences, defined by shopping behavior/needs of individual consumers, i.e., the consumer profile. Ads are served as consumers are shopping/researching, browsing stores/products, or retrieving and reviewing news, information, consuming music, video, games or other type of entertainment services provided via a portal.

The Ad Message Database

This feature of the present invention is used by each participating advertiser to upload advertising campaign data, such as ad message, campaign timings, target audience, frequency and reach objectives, or other information necessary to convey the purpose and effect of the advertisers goals. Further, the ad message database may be used by each participating advertiser to get effectiveness measurement data that may include performance indicators measuring the ad's impact on consumer's shopping behavior, benchmarking data for comparing the ads performance against that of other ads, and/or measurement standards for assessing advertising effectiveness. Performance benchmarking is, therefore, possible in a portal independent manner.

Product & Category Presentation Server

This server searches the central product and retail information databases for shopping information requested by a consumer and serves it in a customized and a portal specific presentation format.

Product Presentation Database

Used by each participating manufacturer to control/customize its presentations. Features which may be customized include, without limitation, specification of product presentation, target audience, and exposure timings. The product presentation database may be used by participating retailers to access and provide up-to-date product presentations, by participating portals to obtain the product presentation for consumers, by participating consumers to get up-to-date product presentations, and/or by each participating manufacturer to get effectiveness measurement data, such as indicators on the presentation's impact on consumer's shopping behavior, benchmarking data for comparing the performance of presentations against each other, or measurement standards for assessing presentations portal and retailer independent.

Retailer Category Presentation Database

This database is used by participating retailers to create/manage retailer category presentations. A retailer category presentation may include a specification of retailer category item composition and presentation format. The retailer category presentation database permits the retailer to access and provide up-to-date product presentations and to regularly update of pricing data and inventory data. This feature may be used by each participating retailer to control/customize its presentations, upload category presentations, preferred target audience, and exposure timings. Moreover, this database may be used by each participating portal to obtain retailer information for consumers, by consumers to get up-to-date retailer information, by participating retailers to get effectiveness measurement data, such as indicators of a category's impact on consumer's shopping behavior, benchmarking data for comparing the performance of categories against each other, and/or measurement standards for assessing category performance in a portal and retailer independent manner.

Consumer Profiler

The consumer profile creates comprehensive, i.e., "holistic purchase-behavior specific", profiles of consumers by tracking individual consumer advertising exposure history and shopping, purchase behavior and preferences across multiple retailer categories, product brands and portals. In a preferred embodiment of the invention, explicit consumer consent is required for such detailed monitoring of the consumer's browsing, purchasing, and other online behavior.

Consumer Profile Database

This database contains consumer ad exposure, product/category retrieval and purchase history, usually in the form of a consumer profile, used to customize product/category presentations and target/serve ads. The database can be accessed by the consumer to change/delete a profile.

Order Processor

A processor for consumer orders, loyalty points, confirmations, payments and delivery messages.

Effectiveness Assessor

The effectiveness assessor provides advertisers with a significant advantage over prior art systems for serving online advertising, by providing a means for gauging the effectiveness of certain ad campaigns, product presentations, etc. The effectiveness assessor registers historical consumer product/category retrieval, purchase and ad exposure data and processes it into standard product/category presentation/advertising effectiveness measurement data, making it possible to assess the impact of advertising, product/retailer presentations, promotions and other factors on the shopping behavior of consumers. Further, the effectiveness assessor permits benchmarking of the effectiveness of product/category presentations and ads against each other.

Ad Rate Calculator

The ad rate calculator dynamically and transparently (from both the advertisers and the media company perspective) calculates ad rates based on the target audience of the campaign and the advertising's impact on the purchase behavior of consumers. To objectively reflect any factual performance differences fairly in its ad rate pricing, the system measures the effectiveness of each contact, benchmarks it against the effectiveness of a reference or mass advertising contact and automatically incorporates the performance difference in the ad pricing.

The product presentation database is filled with product presentation data that is uploaded by manufacturers of goods, providers of services and retailers in the case of retailer branded private-label products. Manufacturers, for example, may submit presentation information for each of its products to the product presentation database and may update that information over time, as their product line, product availability, or specific product specifications may change. Further, the manufacturer will populate the ad messages database with advertisements to be delivered to a specific consumer target audience, based on purchase-based profile criteria and/or consumer audience that the advertiser wants to reach with his advertising message.

This process is illustrated in more detail in FIG. 2 which shows that the manufacturer will define target audiences and will develop product presentations and ad messages specifically designed to appeal to members of the target audience. The return on investment ("ROI") benefits of customizing advertising messages to the shopping needs of different consumers is illustrated in example 2. The ad messages are forwarded to the central database system and stored in the ad message database. The product presentations are forwarded to the central database system and stored in the product presentation database. The system allows advertisers to reach consumers with different types of advertising contacts. Consumers can be contacted substantially anywhere or at anytime, i.e., in the consumer's home via a PC or cable TV/Mira system, in the office via a PC, or when traveling with a mobile device. Consumers can be reached as they are shopping/researching stores/products via their portal personal shopping services and as they are consuming the personal interactive info/news/entertainment of their portal. An overview of the contextual advertising contact possibilities can be found in Appendix I.

For each advertising campaign the Ad Rate Calculator of the present system dynamically and transparently calculates ad rates (a price per 1000 advertisement contacts that is completely transparent to both buyers and sellers of advertisements), based on the target audience of the campaign and the advertising contact's impact on the purchase behavior of consumers. To objectively reflect any 'factual' performance differences 'fairly' in its ad rate pricing, the system measures the effectiveness of each ad contact, benchmarks it against the effectiveness of a reference or mass advertising, and automatically reflects the performance difference in its pricing. The process is based on algorithms described in detail in Appendix III.

Further, this process transforms ad serving and purchasing history (stored in log files) into standard performance indicators and benchmarks them against the mass advertising performance references that are measured following the same measurement methodology. The ad rate calculation algorithm starts with the cost of reaching the target audience via mass advertising, discounts this price with a 'Target Bonus' of x %, corrects it with any advertising effectiveness performance difference between the system's advertising and mass advertising and finally with a 'Pricing Differentiation Index' that allows each interactive personal service provide to keep independent control over their pricing policy. With the proper parameter settings, the system will improve ROI for advertisers while creating premium advertising revenues required to develop profitable media services. This is shown by the illustrations in Appendix III.

Once the advertiser has received the ad rate pricing information, the advertiser will finalize the campaign booking by providing campaign specific timing and frequency information, and by confirming the advertising order that specifies the advertising space purchased, as well as its price.

Similar to the process that occurs with manufacturers, retailers can create definitions of target audiences and create ad messages and category presentations custom-tailored to individual consumers, as shown in FIG. 3a. The retailer's ad messages and category presentations, that are determined by their product item assortment, presentation format and pricing definitions, are stored in their respective databases in the central database system. Moreover, the category presentations stored in the category presentation database may reference information in other databases, such as the product presentation database, permitting the retailer to define categories that include certain types of products and allowing the central database system to filter the records stored in the product presentation database for products meeting the criteria for the retailer's category definition. Retailers may manually define the products to be shown in accordance with their defined category definitions, or preferably the central database system will automatically create categories for the retailer based upon category definition and product presentation data uploaded to the central database system by manufacturers.

The systems capability to send different ad messages to different target audiences is also the basis for the system's in-store traffic generator feature that streamlines current offline retailer store traffic generation programs that advertise weekly price features equally strong to price sensitive switchers as to loyal consumers that buy at the retailer independent of the weekly price features. The present system can aggressively drive on-line awareness of weekly specials among price sensitive occasional consumers and to also improve profit margins by keeping the communication of the weekly specials low among loyal consumers that buy products independently of whether they are offered at a discounted price. The system may allow price sensitive occasional shoppers to buy these weekly specials on-line at special discounted prices and to pick them up in-store while pricing all in-store items at their normal shelf prices. The ROI benefits for the retailer are illustrated in examples 3(a) and 3(b) on page x.

As shown in FIG. 3b, another feature of the retailer aspect of the present system are its distribution center assignment and product stock monitoring functions. These functions permit the retailer to assign the closest distribution center to the consumer, in order to minimize shipping costs and delivery times. The present system also permits retailers to select the closest distribution center to the consumer with the selected product in-stock. The present system may further permit the retailer to send out-of-stock messages from its inventory management systems to the present system and to make sure that the out-of-stock information is automatically reflected in the retailers category presentations that the consumer consults when buying products.

Although only a single manufacturer/retailer is shown in the drawing FIGS. 2 and 3(a) and 3(b), it should be understood that the central database system of the present invention may accept data from a multiple manufacturers/retailers in the same way as here described.

The present invention enhances the functionality of portals by providing shopping/ad services for deploying profitable interactive services. It provides the infrastructure that portals need to offer consumers a differentiated portal-specific personal shopping experience and advertisers with a portal-independent ad planning, delivery, and effectiveness measurement instrument.

Portals employing the present invention get a portal-branded personal shopping tool, with access to the latest up-to-date manufacturer and retailer product/category information stored in the central database, that can provide a distinctive, portal-specific user experience which differentiates one portal from that of competitive portals. To configure the portal-specific experience, portals may create templates that define a portal-specific format in which all product/category information will be sent to the consumer. This personal shopping tool allows the portal's consumers to quickly find product/retailer and consumer feedback information as well as to conveniently (re)order on one platform without having to (re)type in their needs on a multitude of retail, portal and manufacturing websites. It also provides the portal's consumers with a system to control their shopping profiles as well as a loyalty/benefit card that may be portal branded.

Further, the portal may adopt the system's consumer profiling, ad serving, and effectiveness measurement tool that is portal and retailer independent, eliminating an important usage barrier for advertisers. The system makes the management of personalized ads less complex and more manageable. For advertisers, it avoids the need to manage a multitude of different, non-standard portal consumer profiling and effectiveness measurement systems, which make prior art methods of personalized ad management and measurement processes very complicated and inefficient. The system's personalized ad-planning tool further allows to plan personal ad campaigns based on GRP (Gross Rating Points—an industry accepted measure for the # of ad contacts), reach, frequency objectives and Cost/1000 rates that are completely transparent to buyers and sellers of advertisements.

In contrast to prior art systems in which portal pay 'mass' ad prices for their advertising space, the present system's unique portal/retailer independent profiling/effectiveness measurement capabilities permits portals to charge advertisers premium ad rates that are justified by the system's unique capabilities to deliver a higher ROI for advertisers, i.e. capabilities that make it more cost-efficient to reach specific narrow target audiences, to adapt advertisements to the needs/behavior of individual target audiences, and to measure the effect of ads on sales, allowing advertisers to focus investments on high yield ads. The consumer profiling, ad serving and effectiveness measurement tool that is portal and retailer independent thus permits portals to deploy profitable personal interactive news/entertainment services and telco/cable companies to recoup their investments in broadband and 3G infrastructure with ad sponsored info/news/entertainment services.

As shown in FIG. 4, at least one, and preferably many, web portals may be in communication with the central web services system. Portals will have to configure the portal specific formats in which product/category data and ads from the central web services system will be sent to consumers. The portals may include their own news and content generation and delivery functions, or may obtain these services from other content-generation and delivery services (not shown). The portal may obtain product and category data from the central database system's product and category content server, customize the data with the portal's own brand (or co-brand the data to include the brand of a manufacturer or retailer) and provide a user with an integrated, convenient shopping experience without requiring the user to leave the portal website. Further, based on the profile of the consumer stored in the central database system, personal preferences input by the user, the portal site may adapt the personalized news and entertainment content for the consumer.

FIG. 5, shows the marketing communication between a portal site and a consumer for the purpose of initiating a consumer subscription to the services offered by the portal site. The present invention requires interaction with a consumer, so that a profile for the consumer can be established. The profile for the consumer is then used for the purpose of generating personalized services for the consumer. FIGS. 6(a), 6(b) show the processes that may occur for a typical consumer, e.g., the creation of a subscription to use a particular portal (upon which consumers are provided with a benefit card), and the entering and changing of information concerning the user's preferences, i.e., subscriber settings. Once the user has activated their services with a portal, the central database system may create a unique profile file for that consumer, to track the consumer's shopping behavior and preferences across multiple retailer categories, multiple product brands, and/or multiple portals. The user may now begin receiving portal-branded personal shopping and info/news/entertainment services. FIG. 6(c) shows how the consumer profile file that tracks the consumer behavior in the central database system is deleted once the consumer decides to terminate his subscription.

The standardized holistic purchase-behavior specific profiling system, that tracks a consumer purchase behavior and preferences across multiple retailers categories and manufacturers product brands as well as multiple portals is updated to provide each consumer with the most relevant, personalized advertisements. The system also makes consumer's shopping sessions more productive and relevant, thereby increasing the likelihood that they will purchase a product, and improving the convenience of placing repurchase and replenishment orders. The portal-branded personal shopping tool may also allow consumers to consult peer consumer rating and opinions on products and retailers. Additionally, the present invention provides consumers with a convenient portal-branded privacy shopping tool that permits them to have control over their profiles, i.e., giving the consumer the possibility of deleting or changing their personal profiles, asking consumers for permission to collect profiles and consumer feedback, and rewarding them financially for this data with free personalized ad-sponsored info, news, music and entertainment services. The extensiveness and value of the personalized ad-sponsored info, news, music and entertainment services may dependent on the consumer usage of the portal-branded shopping tool. The operation of the reward system can be compared with that of an activity based loyalty point system. To be able to capture consumers in-store purchases each consumer is provided with a benefit card that provides members with access to special benefits and promotions. The card allows consumers to earn bonus points for free portal-branded personalized digital info, news and entertainment, on all their on-line and offline purchases at retailing members, and provides card holders with unique preferential access to special promotions of participating retailers and manufacturers.

In a typical on-line shopping session shown in FIGS. 7(*a*)-(*e*), the consumer logs into the interactive personal shopping service of his portal upon which the central system is activated. The consumer then makes a request for manufacturer product and or retailer category information. This information can either be a complete retailer store front, or advertising information stored in the portal's 'retailer specials' and/or product registry. As indicated in appendix I, the portal's 'retailer specials' and/or 'product registry' works like a directory, allowing manufacturers to describe their products to consumers and retailers to describe their weekly special offers. The consumer requested information is fetched in the databases of the central system together with advertisements that fit the specific profile criteria of the consumer. The system then activates a template that defines the portal specific format in which the information will be forwarded to the consumer. The system creates an empty delivery page that is branded with the name of the portal. The product & category server of the present system fills the 'empty info section' on the page with the requested information and the ad server fills the 'empty ad slot' on the page with the earlier fetched consumer specific advertisement upon which the 'delivery page' is forwarded to the consumer. The process ends with the consumer profiler, effectiveness assessor and the systems ad, product presentation and category presentation databases receiving log file messages specifying the advertisements, the product and retailer specials registry information, the product presentations, the category presentations as well as the consumer ID and the exposure date of the information transmitted.

The consumer generally will be in communication with the present system via a user terminal connected to the internet or other distributed network. Each time a user makes a selection during the shopping process, the consumer profile processor is notified, so that it may update the consumer profile database. Further, the effectiveness assessor processor receives notification of the product and category information retrieved by the consumer and updates the product and category presentation databases. The effectiveness assessor processor also receives notification of the advertisements to which the consumer has been exposed and updates the ad message database.

When a consumer places an on-line order, the present system may provide the ability to process the customer's order, including processing payment, providing order confirmation to the buyer, and notifying the retailer's order fulfillment processing means, as shown in FIGS. 8(*a*), 8(*b*), 8(*d*). Further, as shown in FIG. 8(*c*), the consumer profile processor may be notified of the purchase and pertinent information is processed by the consumer profile process to update the consumer's profile database, the advertising and the product and category presentation databases. Such pertinent information may include the item selected for purchase, the retailer, the category, quantity, price, the consumer's identity, date of purchase, price, etc. This data may also be transmitted to the effectiveness assessor processor. The effectiveness assessor process may use it to update the product and category presentation database and to generate statistics that are helpful to the manufacturer, retailer, and portal operator. The present system may also process offline consumer purchase data of in-store purchases that were effectuated scanning the system's benefit card at the retailer's cashier system, as shown in FIG. 9. In this case, the system's consumer profiler processes an in-store purchase log file (specifying the retailer, the consumer ID, the purchased items, the quantity purchased, the price and the date of purchase, etc.), received electronically from the retailer, and updates the consumer's profile database, the advertising and the product and category presentation databases as previously described. When a consumer places an on-line order, that the consumer will pick-up in-store, the present system may again provide the ability to process the customer's order, including processing payment, providing order confirmation to the user, and notifying the retailer's order fulfillment processing means. The system may also notify the retailer cashier system of the pre-paid order placed. This is shown in FIGS. 10(*a*), 10(*b*). Further, the consumer profile processor may be notified of the purchase and pertinent information is processed by the consumer profile process to update the consumer's profile database, the advertising and the product and category presentation databases as previously described. When the consumer goes to the store to pick up the pre-paid merchandise as well as any other items that he might decide to buy, he identifies himself with his benefit card at the cashier, as shown in FIG. 10(*c*). The merchandise and the benefit card are scanned and cashier system accesses the pre-paid order file of the card holder and deducts the pre-paid amount from the bill, upon which the balance is paid, as shown in FIG. 10(*d*). Further, as shown in FIG. 10(*e*), the consumer profile processor may be notified electronically by the retailer of the purchase and pertinent information is processed by the consumer profile process to update the consumer's profile database, the advertising and the product and category presentation databases as previously described. The present system is applicable to the consumer receiving and displaying shopping data using a conventional web-browser via an internet connected PC or any type of electronic device (mobile phone, Mira displays, cable TV set-up box) connected to any type of mobile, distributed or local network using any type of transmission protocol.

In a typical online info/news/entertainment consumption session, shown in FIGS. 11(*a*)-(*c*), the consumer logs into the interactive info/news/entertainment service of his portal upon which the consumer id number is forwarded to the central system. The system is activated, retrieves the ads that are relevant for this consumer and this info/news/entertainment session and sends the consumer specific ads to the portal content server, that inserts the ads in the appropriate portal branded personal info/news/entertainment services ad slots. Alternatively, the system may also send the ads directly to terminal of the consumer where they are inserted into the info/news page as a 'print ad', into a media player that is used for playing audio or video clip tracks as a 'radio' or 'TV ad' or any software application that the consumer is using for playing interactive games. The process ends with the system's consumer profiler, effectiveness assessor, and ad database receiving a log file message specifying the advertisement, as well as the consumer ID and the exposure date of the advertisement transmitted.

The present system is applicable to the consumer receiving and displaying advertisements using a conventional web-browser via an internet connected PC or any type of electronic device (mobile phone, Mira displays, cable TV set-up box) connected to any type of mobile, distributed or local network using any type of transmission protocol.

In a daily consumer 'Target Audience Categorization and Effectiveness Evaluation Benchmarking Run' (a 'batch' operation), that is illustrated in FIG. 12(a), the central system measures the value of each consumer profile parameter and benchmarks each consumer against each other, categorizing them into groups with similar shopping habits/needs. The system reviews the daily product/category retrieval, ad exposure and purchase history of each consumer with the objective of assigning consumers to specific target audiences with common identical shopping/purchase habits/needs in a way that is retailer and portal independent (e.g. prospects, users/non-users, loyal users/shoppers, etc.) so that these daily updated target audiences can be used as the basis for targeting and customizing advertising messages and product/category information. In the same operation, the central system may process the database log data files, to generate updated consumer feedback on manufacturer and retailer product/category presentations and personalized ad campaigns retailers that allows to benchmark the different product/category presentations and personalized ad messages against each other, allowing the evaluation of the effectiveness of marketing programs, assortments and products.

Specific details and algorithms which, by way of example, demonstrate how the effectiveness assessor processor may operate are included in attached Appendix II, which is hereby incorporated by reference.

The system may also periodically create consumer attitude assessment data on manufacturer brands, and retailers' portals' interactive services, as shown in FIG. 12b. The system may send electronic evaluation questionnaires to an attitude panel of representative consumers. The consumers of this panel fill in the questionnaires and return them electronically. The attitudes on the products, retailers and interactive services are processed.

As illustrated by FIG. 12(c), all the market intelligence about products, retailers and advertisements can be accessed on-line on via a web services extranet, to which marketing and category managers of the member companies have access with their password.

Example 1

The Positive Impact of the Effectiveness Measurement Capability on ROI

Previously, manufacturers and retailers who spent money on advertisements could only gauge the effectiveness of their advertising expenses by comparing their gross sales to periods before, during, and/or after the advertising campaign was initiated. Using the present system, the effectiveness assessor process can provide retailers and manufacturers with real-time analysis of the value of the advertising expenses. In today's 'mass' media world it is extremely difficult and expensive to measure the impact of advertising on actual consumer sales. The most accurate measuring method, is through a consumer panel test, where consumers' TV programs are interrupted by special 'split cable' test advertising blocks and where consumers' purchases are monitored through the scanners of the consumer's supermarkets. The technique requires months of preparation and is very expensive. The method is, therefore, used in a minority of cases (less then 1% of all ads aired). More frequently, less sophisticated and expensive research techniques are used. These testing methods are less reliable, as they cannot measure the impact of advertising on actual consumer sales. In practice, many advertisers will base their 'airing' decision on the 'qualitative' input of a couple of focus group consumers. Without a proper testing method that measures the impact of the advertisement on consumer sales, it is extremely difficult to distinguish the 'ads that sell' from the 'ads that do not sell'. The present system can help improve advertising ROI in a major way: advertising impact on sales can be measured almost instantly and for free. This has major consequences for advertisers, because they can easily distinguish the 'ads that sell' from the 'ads that do not sell' and can make sure that they put their money into the ads that have a proven pedigree, thereby significantly boosting the return on their invested advertising dollar. The invention is further illustrated, but not limited, by way of the following examples.

Advertiser A develops three spot alternatives (a1, a2, a3), each with a random effectiveness (5%, 15% and 1%) that is difficult to predict and unknown before testing. To find out which spot is the best the advertiser uses Iawai.net and selects the spot with the highest impact on sales. He finds out that this is spot a2 with a 15% share growth impact on sales. Without the present invention, the advertiser would not have been able to identify the 'best selling' spot. He would have selected spot (a), believing that it would deliver a 'random' 10% share growth impact. The measurement capabilities of the present system show 5 ppts. additional share growth, which can be translated into a 50% additional ROI.

Advertiser B develops three spot alternatives (b1, b2, b3, b4, b5), each with a random effectiveness (5%, 10%, 20%, 15% and 15%) that is difficult to predict and unknown before testing. To find out which spot is the best the advertiser uses data generated by the effectiveness assessor feature of the present system and selects the spot with the highest impact on sales. He finds out that this is spot b3 with a 20% share growth impact on sales. Without the effectiveness assessor processor, the advertiser would not have been able to identify the 'best selling' spot. He would have selected spot (b), that would have delivered a 'random' 11% share growth impact. The measurement capabilities of effectiveness assessor generator, in this case, deliver 9 ppts. additional share growth, which can be translated into a 82% additional ROI.

The share increases of the different campaigns A and B are weighted with the media weight, that is put behind the campaigns and then added. The result is the Performance Index for both the advertising made in accordance with the present invention and the 'mass' advertising and an ROI effectiveness factor of 1.70, i.e. advertising according to the present invention that is providing a 70% higher ROI than 'mass' advertising.

The effectiveness assessor processor makes it possible for advertisers to filter out ineffective ads and to focus advertising investments exclusively on 'high yield' ads, as illustrated in FIG. 13.

Example 2

The Positive Advertising ROI Impact of Customization of Advertising Messages to Narrow Consumer Groups Defined by Their Shopping Behavior/Needs In FIG. 14, it is illustrated how Iawai.net 'Personalized' advertising consisting of 4 more relevant 'personalized' ads ('easy usage!', 'try us!', 'brand x is.', we're new!') targeted at 4 different target groups ('brand users', 'interested non-users', 'non-aware', 'un-impressed') could improve the advertising ROI for advertisers versus 'mass' advertising, consisting of one 'generic' ad (we're it!), that is a less relevant compromise 'message', that treats all consumers as being equal.

Example 3

The Positive Impact of the Shopper Specific Differentiated in-Store Traffic Generation Capability on ROI for Retailers The system's capability to sent different ad messages to different target audiences is also the basis for the system's 'in-store traffic generator' application software functionality that drives the inefficiency out of current offline store traffic generation programs that advertise weekly 'price features' equally strong to 'price sensitive switchers' as to 'loyal consumers that buy at the retailer independent of the weekly 'price features''. The 'in-store traffic generator' allows to aggressively drive the on-line awareness of 'weekly specials' among 'price sensitive occasional' consumers and to simultaneously improve profit margins by keeping the communication of the 'weekly specials' low among loyal consumers that buy products independently of whether they are 'on feature'. The in-store traffic generator allows 'price sensitive occasional shoppers' to buy these 'weekly specials' on-line at special discounted prices and to pick them up in-store while pricing all in-store items at their normal shelf prices. With the in-store traffic generator' the retailer benefits by discounting only to those consumers that are sensitive to discounting instead of discounting to everybody.

The overall 'in-store traffic generator' process works as follows:

1) The retailers places the 'Weekly Specials' in the 'Retailer Specials' Registry.
2) The retailer places special 'weekly specials' announcement advertising on the interactive personal shopping and news/entertainment services of 'price sensitive occasional' shoppers only.
3) The 'price sensitive occasional' shoppers goes to the 'Retailer Specials' Registry, buys the 'Specials' at a discounted price and pre-pays by credit card.
4) The pre-paid order of the 'Specials' is forwarded to the Retailer Order Information System and a copy of the pre-paid order file is forwarded to the cashier system of the retailer.
5) The consumer goes to the store to pick up the pre-paid merchandise as well as any other items that he might decide to buy now that he is in-store anyway.
6) The consumer goes to the cashier and identifies himself with his iawai.net benefit/ID-card, the cashier scans the merchandise and the benefit/id-card and cashier system accesses the pre-paid order file of the iawai.net card holder and deducts the pre-paid amount from the bill, upon which the consumer pays the balance and takes his merchandise home.

The below tables illustrate the 'Store Traffic Generation/Featuring' Cost/ROI gains, that retailers can realize through Iawai.net's 'personalized store traffic generation' process.

| | Communication of: 'this week Specials' | | | | | |
|---|---|---|---|---|---|---|
| | Via 'Mass' Media Print | | | Via Iawai.net 'Retailer Specials' | | |
| | Total (loyals + switchers) | non price sensitive 'loyals' | Price sensitive 'switchers' | Total (loyals + switchers) | non price sensitive 'loyals' | Price sensitive 'switchers' |
| Customer Base: Sales/Customer: | 100% | ⅔ | ⅓ | 100% | ⅔ | ⅓ |
| incremental yearly sales* incremental 6% operation margin Cost/Customer: | $33 (+0.6%) $2 | — | $100 (+2%) $6 | $33 (+0.6%) $2 | — | $100 (+2%) $6 |
| communication margin loss**** ($ price discount on feature items) | 0.05** $1.80 | 0.05** $1.80 | 0.05** $1.80 | 0.01*** $0.60 | — | 0.03** $1.80 |
| Total Cost Return/Customer (index) ROI | $1.85 | $1.85 $0.15 (100) 8.3% | $1.85 | $0.61 | $1.39 (926) 229% | |

*an yearly additional shopping worth $100 (1 week);
**Print C/M (target audience: all HH);
***Iawai.net 'retailer specials' C/M;
****assumption: 1.8% margin loss on featured items In the below example Iawai.net increases the return for a 'electronics retailer' 2.5 times

|  | Communication of: 'this week Specials' | | | | | |
|---|---|---|---|---|---|---|
|  | Via 'Mass' Media Print | | | Via Iawai.net 'Retailer Specials' | | |
|  | Total (loyals + switchers) | non price sensitive 'loyals' | Price sensitive 'switchers' | Total (loyals + switchers) | non price sensitive 'loyals' | Price sensitive 'switchers' |
| Customer Base: | 100% | 20% | 80% | 100% | 20% | 80% |
| Sales/Customer: |  |  |  |  |  |  |
| incremental yearly sales* | $400 (+6%) | — | $500 (+7%) | $400 (+6%) | — | $500 (+7%) |
| incremental 6% operation margin Cost/Customer: | $24 |  | $30 | $24 |  | $30 |
| communication margin loss**** ($ price discount on feature items) | 0.05** $20 | 0.05** $20 | 0.05** $20 | 0.02*** $16 | — | 0.03** 20 |
| Total Cost | $20.05 | $20.05 | $20.05 | $16.02 |  |  |
| Return/Customer (index) |  | $4 (100) |  |  | $8 (200) |  |
| ROI |  | 20% |  |  | 50% |  |

*an yearly additional shopping worth $500;
**Print C/M (target audience: all HH);
***Iawai.net 'retailer specials' C/M;
****assumption: 4% margin loss on featured items

I claim:

1. A process for improving communication effectiveness between manufacturers, retailers and individual consumers and making information exchange easier, comprising:
   collecting data indicating shopping and purchase behavior history for a plurality of individual consumers, wherein said collecting of data indicating shopping behavior history is performed by parsing, using a programmed computer processor, log files indicating information each consumer retrieves on-line with respect to products featured in a product presentation database and with respect to retailer categories featured in a retailer category presentation database coupled to a central web-services database system, and said collecting of data indicating purchase behavior history is performed by using benefit cards to capture on-line and in-store sales made to the consumers by a plurality of retailers of the products featured in the product presentation database and the retailer category presentation database, wherein each of the plurality of individual consumers is provided with a benefit card that uniquely identifies an individual consumer and provides the individual consumer with an opportunity to earn points based on purchases made by the individual consumer of the products, said products being manufactured by a plurality of manufacturers and sold by the plurality of retailers at least some of which are independent of the manufacturers;
   providing the individual consumers with access to ad-sponsored content that includes at least one from the group consisting of news, music, games, entertainment or shopping content, and wherein the ad-sponsored content is provided to each individual consumer in exchange for at least one of redemption of points earned by the consumer using the benefit card and access to the collected data indicating shopping behavior history with respect to the products featured in the product presentation database and with respect to retailer categories featured in the retailer category presentation database, the collected data indicating purchase behavior history captured using the benefit cards of on-line and in-store sales made by the plurality of retailers of the products featured in the product presentation database and the retailer category presentation database, and advertisement exposure history of the consumer;
   collecting data indicating advertisement exposure history for each of the individual consumers by logging advertisements served to the consumer along with ad-sponsored content;
   generating, using a programmed computer processor, a consumer profile for each of the individual consumers from the collected data indicating shopping behavior history with respect to the products featured in the product presentation database and with respect to the retailer categories featured in the retailer category presentation database, the collected data indicating purchase behavior history captured using the benefit cards of on-line and sales made by the plurality of retailers of the products featured in the product presentation database and the retailer category presentation database, and data indicating advertisement exposure history collected for the consumer;
   providing the product presentation database, coupled to the central web-services database system, that stores product presentation data for the products featured in the product presentation and retailer category presentation databases, wherein changes to product presentation data stored in the product presentation database are automatically reflected on one or more online retail storefronts;
   storing, by a plurality of the manufacturers or by one or more of the retailers in the case of retailer branded private label products, product presentation data in the product presentation database;
   providing the retailer category presentation database, coupled to the central web-services database system, that stores product category presentation data for the retailer categories featured in the retailer category presentation database, wherein at least one of the retailer categories featured in the retailer category presentation database includes references to product presentation data stored by a plurality of the manufacturers in the product presentation database, and wherein changes to the product category presentation data stored in the category presentation database are automatically reflected on one or more of the online retail storefronts;

storing, by the one or more retailers, product category presentation data in the retailer category presentation database;

creating, by at least one retailer, using a programmed computer processor, an online retail storefront using information in the product presentation database and the category presentation database and consumer profiles of consumers visiting the online retail storefront;

providing the individual consumers with access to one or more online retailer storefronts;

serving one or more of the online retail storefronts to consumers based on the consumer profiles of the consumers, wherein the consumer profiles used for serving the online retail storefronts were generated from the collected data indicating shopping behavior history with respect to the products featured in the product presentation database and with respect to the retailer categories featured in the retailer category presentation database, the collected data indicating purchase behavior history captured using the benefit cards of on-line and in-store sales made by the plurality of retailers of the products featured in the product presentation database and the retailer category presentation database, and data indicating advertisement exposure history collected for the consumers;

monitoring independently of the serving of the online retail storefronts with respect to at least one product, manufacturer, retailer category or retailer the shopping and online and in-store purchase behavior of consumers with a common consumer profile to whom a benefit card has been provided; and wherein said shopping behavior of the consumers is monitored by parsing, using a programmed computer processor, the log files indicating information each consumer retrieves on-line corresponding to products featured in the product presentation database and retailer categories featured in the retailer category presentation database coupled to the central web-services database system, and wherein the on-line and in-store purchase behavior of the consumers is monitored by using the benefit cards to capture on-line and in-store sales made to the consumers by a plurality of retailers;

calculating, using a programmed computer processor, for at least one product, manufacturer, retailer category or retailer one or more overall effectiveness indicators based on the monitored shopping and purchase behavior of consumers with a common consumer profile.

* * * * *